(12) United States Patent
Vlachogiannis et al.

(10) Patent No.: US 11,102,095 B2
(45) Date of Patent: *Aug. 24, 2021

(54) MONITORING DATA QUEUES AND PROVIDING ALERTS

(71) Applicant: SPLUNK INC., San Francisco, CA (US)

(72) Inventors: Ioannis Vlachogiannis, San Francisco, CA (US); Panagiotis Papadomitsos, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/539,981

(22) Filed: Aug. 13, 2019

(65) Prior Publication Data
US 2020/0044948 A1    Feb. 6, 2020

Related U.S. Application Data

(63) Continuation of application No. 15/799,720, filed on Oct. 31, 2017, now Pat. No. 10,425,300, which is a (Continued)

(51) Int. Cl.
*G06F 15/173* (2006.01)
*H04L 12/26* (2006.01)
(Continued)

(52) U.S. Cl.
CPC ........ *H04L 43/062* (2013.01); *G06F 11/1464* (2013.01); *G06Q 10/06* (2013.01);
(Continued)

(58) Field of Classification Search
CPC ....... H04L 43/062; H04L 49/90; H04L 51/18; H04L 51/34; G06F 11/1464; G06F 2201/805; G06Q 10/06; G06Q 10/10
(Continued)

(56) References Cited

U.S. PATENT DOCUMENTS 6,496,908 B1    12/2002    Kamvysselis et al.
6,782,410 B1    8/2004    Bhagat et al.
(Continued)

OTHER PUBLICATIONS

Non-Final Office Action dated Jan. 3, 2020 in U.S. Appl. No. 15/493,073. 12 pages.

(Continued)

*Primary Examiner* — Imad Hussain
(74) *Attorney, Agent, or Firm* — Shook, Hardy & Bacon, L.L.P.

(57) ABSTRACT

A computer-implemented method, system, and computer-readable media are disclosed herein. In embodiments, the computer-implemented method may entail receiving, by a data service, live data associated with an entity. The entity may be, for example, a customer of the data service. The method may then route the live data to a dual-queue system of the data service. The live data may be loaded into a live data queue of the dual queue system for processing. Processing may entail generating summary statistics from the live data. An alert may then be transmitted to the customer in response to detecting the occurrence of one or more alert events. In embodiments, the alert events may include events identified in the summary statistics. Additional embodiments are described and/or claimed.

30 Claims, 7 Drawing Sheets

Related U.S. Application Data continuation of application No. 14/699,996, filed on Apr. 29, 2015, now Pat. No. 9,838,346, which is a continuation-in-part of application No. 14/530,445, filed on Oct. 31, 2014, now Pat. No. 9,753,818, and a continuation-in-part of application No. 14/217,454, filed on Mar. 17, 2014, now abandoned.

(60) Provisional application No. 62/053,101, filed on Sep. 19, 2014.

(51) Int. Cl.
    *H04L 12/58*     (2006.01)
    *G06Q 10/06*     (2012.01)
    *G06Q 10/10*     (2012.01)
    *G06F 11/14*     (2006.01)
    *H04L 12/861*     (2013.01)

(52) U.S. Cl.
    CPC .............. *G06Q 10/10* (2013.01); *H04L 49/90* (2013.01); *H04L 51/18* (2013.01); *H04L 51/34* (2013.01); *G06F 2201/805* (2013.01)

(58) Field of Classification Search
    USPC ........................................................ 709/224
    See application file for complete search history.

(56) References Cited

U.S. PATENT DOCUMENTS

| | | | |
|---|---|---|---|
| 7,346,805 B1 | 3/2008 | Scharland et al. | |
| 7,519,870 B1 | 4/2009 | Sim-Tang | |
| 7,558,928 B1 | 7/2009 | DeVos | |
| 7,581,007 B2 | 8/2009 | Yamagami | |
| 7,937,344 B2 | 5/2011 | Baum et al. | |
| 7,970,949 B2 | 6/2011 | Pope et al. | |
| 8,112,425 B2 | 2/2012 | Baum et al. | |
| 8,335,969 B2 | 12/2012 | Gubbi et al. | |
| 8,352,494 B1 | 1/2013 | Badoiu | |
| 8,429,482 B1 | 4/2013 | Payne et al. | |
| 8,484,242 B1 | 7/2013 | Singh et al. | |
| 8,751,486 B1 | 6/2014 | Neeman et al. | |
| 8,751,529 B2 | 6/2014 | Zhang et al. | |
| 8,788,525 B2 | 7/2014 | Neels et al. | |
| 8,825,937 B2 | 9/2014 | Atkisson et al. | |
| 8,898,520 B1 | 11/2014 | Ford et al. | |
| 8,977,595 B1 | 3/2015 | Leonard | |
| 8,990,637 B1 | 3/2015 | Vlachogiannis et al. | |
| 9,208,000 B2 | 12/2015 | Vlachogiannis et al. | |
| 9,215,240 B2 | 12/2015 | Merza et al. | |
| 9,286,413 B1 | 3/2016 | Coates et al. | |
| 9,355,006 B2 | 5/2016 | Vlachogiannis et al. | |
| 9,514,021 B2 | 12/2016 | Vlachogiannis et al. | |
| 9,660,930 B2 | 5/2017 | Vlachogiannis et al. | |
| 9,753,818 B2 | 9/2017 | Vlachogiannis et al. | |
| 9,838,346 B2 | 12/2017 | Vlachogiannis et al. | |
| 9,838,467 B2 | 12/2017 | Vlachogiannis et al. | |
| 10,055,312 B2 | 8/2018 | Papadomitsos et al. | |
| 10,061,680 B2 | 8/2018 | Vlachogiannis et al. | |
| 10,127,258 B2 | 11/2018 | Lamas et al. | |
| 10,425,300 B2 * | 9/2019 | Vlachogiannis | G06F 11/1464 |
| 10,545,838 B2 | 1/2020 | Papadomitsos et al. | |
| 10,599,529 B2 | 3/2020 | Vlachogiannis et al. | |
| 2001/0047390 A1 | 11/2001 | McGann et al. | |
| 2002/0016827 A1 | 2/2002 | McCabe et al. | |
| 2002/0052909 A1 | 5/2002 | Seeds | |
| 2002/0165864 A1 | 11/2002 | Azagury et al. | |
| 2003/0009553 A1 | 1/2003 | Benfield et al. | |
| 2003/0018483 A1 | 1/2003 | Pickover et al. | |
| 2003/0126387 A1 | 7/2003 | Watanabe | |
| 2003/0158847 A1 | 8/2003 | Wissner et al. | |
| 2004/0003069 A1 | 1/2004 | Wong | |
| 2004/0024771 A1 | 2/2004 | Jain et al. | |
| 2004/0078438 A1 | 4/2004 | Pyle et al. | |
| 2004/0133622 A1 | 7/2004 | Clubb et al. | |
| 2004/0163115 A1 | 8/2004 | Butzer | |
| 2004/0181600 A1 | 9/2004 | Yamagami | |
| 2005/0010753 A1 | 1/2005 | Marceau et al. | |
| 2005/0027892 A1 | 2/2005 | McCabe et al. | |
| 2005/0071527 A1 | 3/2005 | Cordina et al. | |
| 2005/0081080 A1 | 4/2005 | Bender et al. | |
| 2005/0086359 A1 | 4/2005 | Banerjee et al. | |
| 2005/0114510 A1 | 5/2005 | Error et al. | |
| 2005/0172054 A1 | 8/2005 | Mathrubutham et al. | |
| 2005/0212903 A1 | 9/2005 | Corbett et al. | |
| 2005/0240677 A1 | 10/2005 | Liu et al. | |
| 2006/0010347 A1 | 1/2006 | Sugihara | |
| 2006/0112114 A1 | 5/2006 | Yu et al. | |
| 2007/0011267 A1 | 1/2007 | Overton et al. | |
| 2007/0094206 A1 | 4/2007 | Yu et al. | |
| 2007/0162637 A1 | 7/2007 | Mirabeau et al. | |
| 2007/0207793 A1 | 9/2007 | Myer et al. | |
| 2008/0022183 A1 | 1/2008 | Arslan et al. | |
| 2008/0091491 A1 | 4/2008 | Thorpe et al. | |
| 2008/0091806 A1 | 4/2008 | Shen et al. | |
| 2008/0243845 A1 | 10/2008 | Wouhaybi et al. | |
| 2009/0157641 A1 | 6/2009 | Andersen et al. | |
| 2009/0234908 A1 | 9/2009 | Reyhner et al. | |
| 2010/0017532 A1 | 1/2010 | Bowen | |
| 2010/0050055 A1 | 2/2010 | Tanaka et al. | |
| 2010/0058012 A1 | 3/2010 | Okada et al. | |
| 2010/0250748 A1* | 9/2010 | Sivasubramanian | G06F 11/3442 709/226 |
| 2010/0281000 A1 | 11/2010 | Lehr et al. | |
| 2011/0022801 A1 | 1/2011 | Flynn | |
| 2011/0191290 A1 | 8/2011 | Gutlapalli et al. | |
| 2011/0213886 A1 | 9/2011 | Kelkar et al. | |
| 2011/0258391 A1 | 10/2011 | Atkisson et al. | |
| 2012/0066271 A1 | 3/2012 | Chandrasekar et al. | |
| 2012/0124294 A1 | 5/2012 | Atkisson et al. | |
| 2012/0173589 A1* | 7/2012 | Kwon | G06F 16/2282 707/803 |
| 2012/0198052 A1 | 8/2012 | Ljung et al. | |
| 2012/0198175 A1 | 8/2012 | Atkisson | |
| 2012/0210041 A1 | 8/2012 | Flynn et al. | |
| 2012/0215997 A1 | 8/2012 | Stanfill et al. | |
| 2012/0246556 A1 | 9/2012 | Chikirivao et al. | |
| 2012/0278678 A1 | 11/2012 | Kruglick | |
| 2012/0310427 A1 | 12/2012 | Williams et al. | |
| 2013/0036375 A1 | 2/2013 | Zavatone et al. | |
| 2013/0067179 A1 | 3/2013 | Paleologu et al. | |
| 2013/0090961 A1 | 4/2013 | Smith | |
| 2013/0103708 A1 | 4/2013 | Kim et al. | |
| 2013/0135997 A1 | 5/2013 | Lee | |
| 2013/0144736 A1 | 6/2013 | Vodopia | |
| 2013/0191601 A1 | 7/2013 | Peterson et al. | |
| 2013/0212267 A1 | 8/2013 | Kern et al. | |
| 2013/0290931 A1 | 10/2013 | Wall et al. | |
| 2013/0332996 A1 | 12/2013 | Fiala et al. | |
| 2014/0032566 A1 | 1/2014 | Agarwal et al. | |
| 2014/0040884 A1 | 2/2014 | Donahue | |
| 2014/0046956 A1 | 2/2014 | Zenger et al. | |
| 2014/0047107 A1 | 2/2014 | Maturana et al. | |
| 2014/0068083 A1 | 3/2014 | Tyagi et al. | |
| 2014/0081906 A1 | 3/2014 | Geddam et al. | |
| 2014/0095505 A1 | 4/2014 | Blanchflower et al. | |
| 2014/0156038 A1 | 6/2014 | Poyhtari et al. | |
| 2014/0180826 A1 | 6/2014 | Boal | |
| 2014/0215057 A1 | 7/2014 | Walsh et al. | |
| 2014/0298009 A1 | 10/2014 | Hattori et al. | |
| 2014/0337345 A1 | 11/2014 | Motoyama | |
| 2014/0337442 A1 | 11/2014 | Zhuang et al. | |
| 2015/0019812 A1 | 1/2015 | Ban | |
| 2015/0186064 A1 | 7/2015 | Chen et al. | |
| 2015/0222723 A1 | 8/2015 | Adapalli et al. | |
| 2015/0261455 A1 | 9/2015 | Gough et al. | |
| 2015/0261622 A1 | 9/2015 | Vlachogiannis et al. | |
| 2015/0264002 A1 | 9/2015 | Vlachogiannis et al. | |
| 2015/0264152 A1 | 9/2015 | Vlachogiannis et al. | |
| 2015/0295848 A1 | 10/2015 | Vlachogiannis et al. | |
| 2015/0301861 A1 | 10/2015 | LaChiusa et al. | |
| 2016/0019636 A1 | 1/2016 | Adapalli et al. | |
| 2016/0085637 A1 | 3/2016 | Vlachogiannis et al. | |

(56) References Cited

U.S. PATENT DOCUMENTS

| | | |
|---|---|---|
| 2016/0087855 A1 | 3/2016 | Vlachogiannis et al. |
| 2017/0046244 A1 | 2/2017 | Vlachogiannis et al. |
| 2017/0237683 A1 | 8/2017 | Vlachogiannis et al. |
| 2018/0054474 A1 | 2/2018 | Vlachogiannis et al. |
| 2018/0336118 A1 | 11/2018 | Vlachogiannis et al. |
| 2019/0098106 A1 | 3/2019 | Mungel et al. |
| 2020/0226036 A1 | 7/2020 | Papadomitsos et al. |

OTHER PUBLICATIONS

U.S. Appl. No. 14/699,996, filed Apr. 19, 2015, Which is:, Granted.
U.S. Appl. No. 16/752,878, filed Jan. 27, 2020, Which is:, Published.
U.S. Appl. No. 14/530,445, filed Oct. 31, 2014, Which is:, Granted.
U.S. Appl. No. 14/699,984, filed Apr. 29, 2015, Which is:, Granted.
U.S. Appl. No. 14/699,992, filed Apr. 29, 2015, Which is:, Granted.
U.S. Appl. No. 14/217,454, filed Mar. 17, 2014, Which is:, Abandoned.
U.S. Appl. No. 14/686,669, filed Apr. 14, 2015, Which is:, Granted.
U.S. Appl. No. 15/493,073, filed Apr. 20, 2017, Which is:, Published.
U.S. Appl. No. 15/799,720, filed Oct. 31, 2017, Which is:, Granted.
U.S. Appl. No. 15/799,682, filed Oct. 31, 2017, Which is:, Granted.
U.S. Appl. No. 15/799,662, filed Oct. 31, 2017, Which is:, Granted.
U.S. Appl. No. 15/665,001, filed Jul. 31, 2017, Which is:, Granted.
U.S. Appl. No. 16/038,683, filed Jul. 18, 2018, Which is:, Granted.
Biitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, pp. 9.
Carasso, David, "Exploring Splunk," published by CITO Research, New York, NY, Apr. 2012, pp. 156.
Splunk Cloud 8.0.2004 User Manual, available online, retrieved May 20, 2020 from docs.splunk.com, pp. 66.
Splunk Enterprise 8.0.0 Overview, available online, retrieved May 20, 2020 from docs.splunk.com, pp. 17.
Splunk Quick Reference Guide, updated 2019, available online at https://www.splunk.com/pdfs/solution-guides/splunk-quick-reference-guide.pdf, retrieved May 20, 2020, pp. 6.
U.S. Appl. No. 14/217,454, of Ioannis Vlachogiannis filed on Mar. 17, 2014, 53 pages.
Vlachogiannis, Jon, "BigData Using Erlang, C and Lisp to Fight the Tsunami of Mobile Data", High Scalability, dated Nov. 26, 2012, 8 pages.
Notice of Allowance dated Sep. 19, 2019 in U.S. Appl. No. 16/038,683, 11 pages.
Notice of Allowance dated Sep. 26, 2019 in U.S. Appl. No. 15/799,662, 8 pages.

\* cited by examiner

MONITORING DATA QUEUES AND PROVIDING ALERTS

CROSS-REFERENCE TO RELATED APPLICATIONS

This application is a Continuation of U.S. patent application Ser. No. 15/799,720 filed Oct. 31, 2017 and titled "Monitoring Data Queues And Providing Alerts," which is itself a Continuation of U.S. application Ser. No. 14/699,996, filed Apr. 29, 2015 which is now issued as U.S. Pat. No. 9,838,346. U.S. Pat. No. 9,838,346 is itself a Continuation-in-Part of U.S. patent application Ser. No. 14/217,454 filed Mar. 17, 2014 which is now Abandoned and U.S. patent application Ser. No. 14/530,445, filed Oct. 31, 2014 which is now issued as U.S. Pat. No. 9,753,818. U.S. Pat. No. 9,753,818 itself claims the benefit of U.S. Provisional Application No. 62/053,101 filed Sep. 19, 2014. The entire contents of each of the foregoing applications being incorporated by reference herein.

TECHNICAL FIELD

The present disclosure generally relates to data processing.

BACKGROUND

Generally, a data server system is a system that performs data operations with respect to data stored in one or more repositories of data. Depending on the type of data server system, the data operations may range from simple operations, such as forwarding, storing, and retrieving the data, to more complex operations, such as calculating statistics based on the data and/or arranging or formatting the data. An example of a data server system is an event-based system, such as the SPLUNK Enterprise software produced and sold by Splunk Inc. of San Francisco, Calif.

In these and other types of data server systems, it can be difficult to optimally perform data operations, particularly as the size and/or complexity of a data repository grows. System administrators may add additional system resources to improve performance, but often these resources may not achieve the desired results, and/or the added expense and overhead for the additional system resources is undesirable.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without these specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase may refer to the same embodiment or another embodiment. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C), or (A, B and C)."

Figure 1:
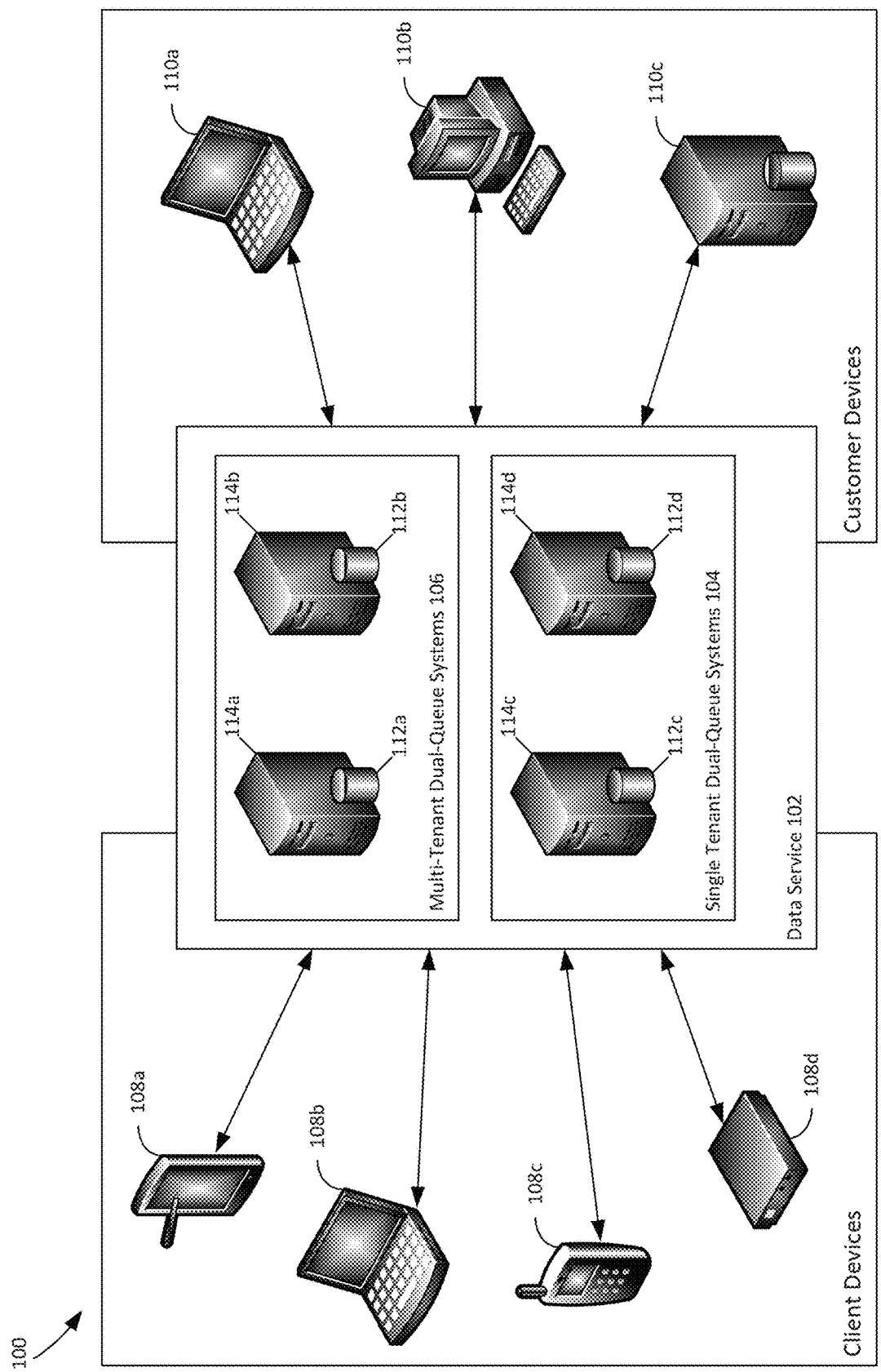
FIG. 1 depicts an illustrative cloud-based system in which various embodiments of the present disclosure may be employed.

It will be appreciated that the data processing techniques described herein are suitable for use by various systems deployed in a variety of operating environments. FIG. 1 illustrates an example cloud-based system 100, hereinafter "system 100," in which the described techniques may be practiced in accordance with various embodiments of the present invention.

System 100 comprises data service 102. Data service 102 may include a plurality of single tenant dual-queue systems 104 and a plurality of multi-tenant dual-queue systems 106. As used herein, a single tenant dual-queue system may include one or more servers (e.g., servers 114c-114d) that have resources continuously or permanently dedicated to incoming or outgoing data of a single customer, while multi-tenant dual-queue systems may include one or more servers (e.g., 114a-114b) that have resources temporarily, ephemerally, or transiently allocated to incoming or outgoing data of each of a plurality of customers on an as-needed or in an on-demand basis.

Because of the above mentioned varied resource allocation, it will be appreciated that the multi-tenant dual-queue systems 106 would generally offer a cost advantage on a per customer basis in addition to offering greater scalability than the single tenant dual-queue systems 104. It will also be appreciated that the single tenant dual-queue systems 104 would typically offer greater or more consistent performance at a greater cost and less scalability. As such, data service 102 may be able to offer a potential customer wishing to try out the services offered by data service 102 a free, or reduced cost, trial period on the multi-tenant dual-queue systems 104 without the cost to the data service 102 of having to implement a single tenant dual-queue system for such a trial. Data service 102 may then migrate the potential customer to the single tenant dual-queue systems, in the event the potential customer elects to subscribe to the services offered by data service 102 once the trial has terminated. The multi-tenant dual-queue systems and the single tenant dual-queue systems are discussed in greater detail in reference to FIG. 2.

System 100 further comprises one or more client devices (e.g., client devices 108a-108d) and one or more customer devices (e.g., customer devices 110a-110c) that are communicatively coupled with data service 102. This communicative coupling can be accomplished through the use of one or more networks. The one or more networks may include any combination of wide-area networks such as the Internet, virtual networks, wireless cellular network, and/or local networks. Data service 102 may receive, over these one or more networks, live, or real-time, data that is generated by client computing devices 108a-108d for processing and/or forwarding of the live data by one of the single tenant dual-queue systems 104 or one of the multi-tenant dual-queue systems 106.

Client devices 108a-108d and customer devices 110a-110c may include general or special-purpose computing devices. Examples of such general or special-purpose computing devices include, but are not limited to, tablet computers (e.g., 108a), laptop computers (e.g., 108b and 110a), mobile phones (e.g., 108c), Internet of things (TOT) devices (e.g., 108d), personal computers (e.g., 110b), web servers/application servers (e.g., 110c), and so forth. Client devices 108a-108d each include one or more processors configured to execute computer-readable instructions.

The computer-readable instructions executed by client devices 108a-108d implement logic for one or more applications. These applications may be, for instance, standalone applications whose instructions are found in software packages that have been installed on the respective device, browser-based applications that are downloaded and executed transiently within the context of a web browser, web applications whose instructions are executed by a web application server in response to requests from client applications, "plug-in" modules of code whose instructions are called in response to various triggering events within the context of other applications or the operating system itself, and so forth. In embodiments, client devices 108a-108d may be configured to transmit data to data service 102. Such data may include data on usage and/or performance of one or more of the above discussed applications.

In embodiments, the data received by data service 102 from each of client devices 108a-108d is segregated based on an entity to which the data is associated. Such an entity may be, for example, a customer or potential customer of data service 102, a type of device that generated the data, an application that generated the data, a project of a customer, or any combination thereof. As used herein, a project of a customer would include any entity that is based on the customer and any additional criteria that are capable of being determined from the data received. For example, a customer of the data service may wish to keep data for different versions of the same application separate. In such an example, the entity would be the combination of the customer and the application version, or a single unique project identifier. This segregation may occur on the fly as the data is received by data service 102. Such a segregation may be carried out by one or more additional servers of data service 102. Once segregated, the data may then be routed to the appropriate dual-queue system for processing of the data (e.g., a dual-queue system associated with the customer).

As mentioned above, single tenant dual-queue systems 104 and multi-tenant dual-queue systems 106 comprise one or more servers 114a-114d. Servers 114a-114d may be general or special-purpose computers, comprising one or more processors and/or other suitable components configured to execute instructions for processing, manipulating, storing, or forwarding the raw data received from the client devices 108a-108d. The raw data received from client devices 108a-108d and/or the resulting processed or manipulated data may be directly output to customer devices 110a-110c and/or persisted in data repositories 112a-112d for backup or later retrieval by customer devices 110a-110c.

Data repositories 112a-112d may be stored on any suitable computer readable storage device. Such storage devices may include hard disk drives, flash drives/solid state drives (SSD), disk arrays, storage area network (SAN) devices, networked-attached storage devices, file server devices, or any other suitable data storage apparatus. In addition, data repositories 112a-112d may be stored in any suitable underlying form(s), such as disk blocks, file structures, database tables, etc., or any combination thereof. In some embodiments, multiple storage devices may be utilized in conjunction to store different portions of an individual data repository on different storage devices. In other embodiments, storage devices may be configured to store some or all portions of an individual data repository redundantly, using any suitable backup and/or synchronization mechanism(s), such as, but not limited to, a redundant array of independent disks (RAID).

Servers 114a-114d may be coupled to the data storage devices that store data repositories 112a-112d using any suitable mechanism, including, but not limited to, a Fiber Channel network, a Serial Advanced Technology Attachment (SATA) link, a Universal Serial Bus (USB) connection, an Infiniband link, an Ethernet connection, etc., or any combination thereof. Servers 114a-114d can send input/output requests to the storage devices that store data repositories 112a-112d in order to read and/or write to the data repositories 112a-112d. These input/output requests can utilize any suitable protocol(s), depending on the environment, including, without limitation, Server Message Block protocol, Network File System protocol, Small Computer System Interface protocol, and/or Fibre Channel Protocol. In response, data server devices 114*a*-114*d* would receive data structures such as data blocks, files, tables, result sets, etc.

System 100 is only one example of the many types of operating environments in which the techniques described herein may be practiced. Other suitable operating environments may include additional or fewer elements, in varying arrangements. For instance, in an embodiment, some or all of the data server devices 114*a*-114*d* are virtual server devices, some or all of which may execute on a single computing device.

Figure 2:
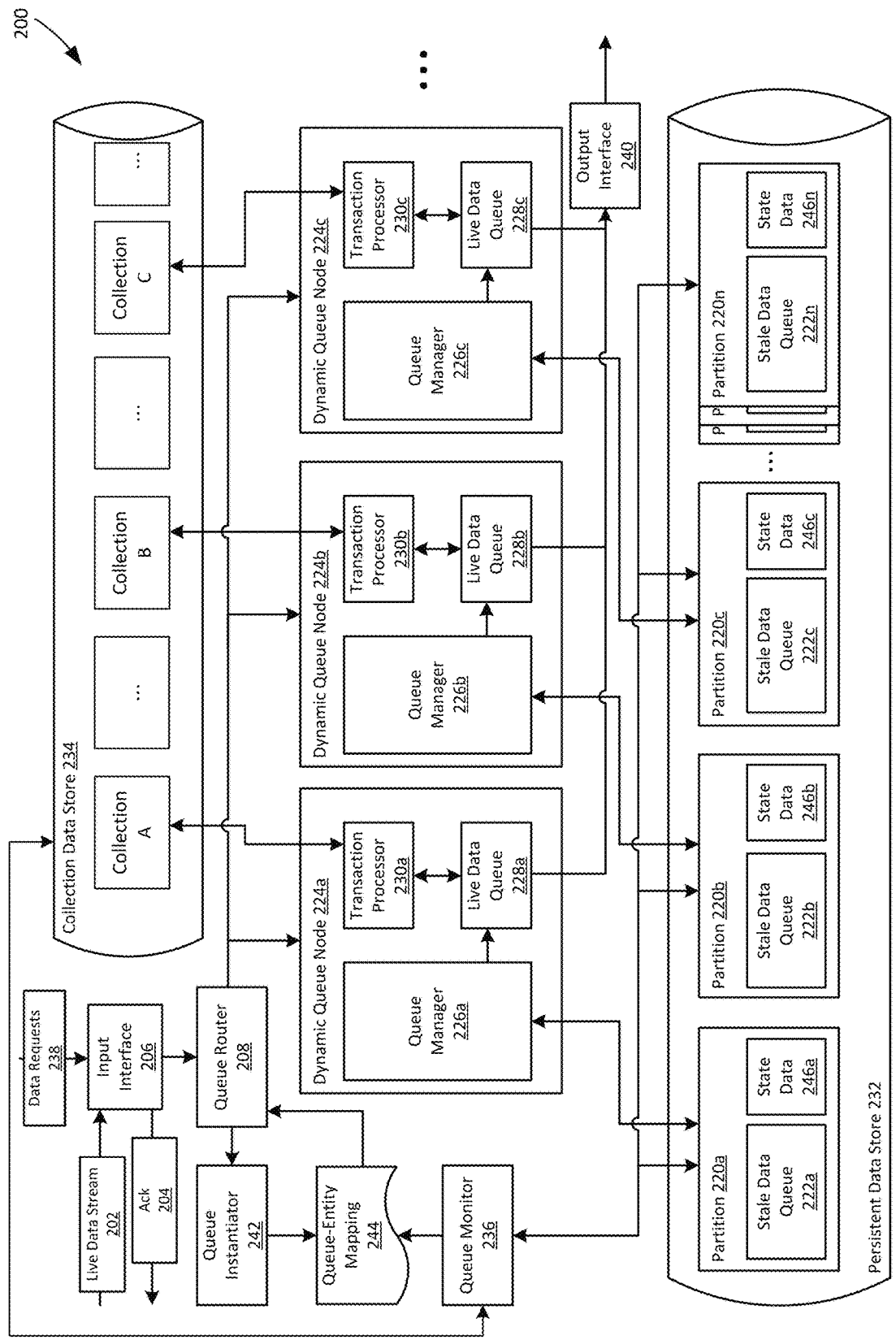
FIG. 2 illustrates an example multi-tenant dual-queue system in which techniques described herein may be practiced, in accordance with various embodiments.

FIG. 2 illustrates an example multi-tenant dual-queue system 200, hereinafter system 200, of a data service (e.g., data service 102 of FIG. 1) in which techniques described herein may be practiced, according to an embodiment. The various components of system 200 are implemented at least partially by hardware at one or more computing devices, such as one or more hardware processors executing instructions, stored in one or more computer-readable memories, for performing various functions described herein. In some embodiments, system 200 is implemented across a plurality of server computing devices, such as servers 114*a*-114*d*, that collectively implement the various components of system 200 as a set of server-side processes. In such embodiments, the plurality of server computing devices may include application framework(s), web server(s), application server(s), and/or other conventional server components that the depicted components utilize to provide the described functionality. Such server computing devices may be virtual or actual computing devices. In other embodiments, system 200 is implemented on a single server.

System 200 may include an input interface 206 that is utilized by system 200 to receive live data stream 202 as well as data requests 238. Live data stream 202 may include live data associated with a plurality of entities, while data requests 238 may include requests for data received in the live data stream. As used herein, live data corresponds to real-time data or data in motion. Live data typically has either remained in-memory (e.g. on an in-memory data path) or in-transmission (encoded in a signal being transmitted from one location to another) since being generated. In contrast, stale data corresponds to non-real time data or data at rest. Stale data is typically retrieved from non-volatile memory, or otherwise fails to meet criteria of live data. As discussed further below, a request for data received in the live data stream may be fulfilled by live data, stale data, or a combination thereof.

Live data stream 202 may comprise a plurality of transactions received from a plurality of source nodes, such as client devices 108*a*-108*d*. The data can be provided to input interface 206 in any of a variety of possible formats, which can optionally be repackaged and/or otherwise modified to provide the transactions to system 200. In some embodiments, input interface 206 receives data in communications from the source nodes and asynchronously acknowledges the receipt to the source nodes. This can be accomplished by any suitable acknowledgment (e.g., ack 204), such as a close connection communication. Thus, system 200 can provide an acknowledgment to the source node with low latency prior to storage or processing of the transaction by system 200. It will be appreciated that no acknowledgment may be recorded where the connection times out.

In a specific example, input interface 206 is a Hypertext Transfer Protocol (HTTP) interface. In such an example, transactions of live data stream 202 are received by input interface 206 in an HTTP POST request. Taking the example further, data requests 238 may be formatted as HTTP GET requests. Each of these HTTP requests is known in the art and will not be discussed in detail. The HTTP POST request, in some embodiments, includes a Uniform Resource Locator (URL) that identifies a specific destination node (e.g., customer device 110*a*-110*c*) as an intended destination for the data. However, in other embodiments, the URL does not identify the specific destination node, and a specific destination node may not be identified until, for example, a request is received for the data. It will be appreciated by those of skill in the art that a live data stream can be received via any number of interfaces. As such, the HTTP example discussed above should not be viewed as limiting of this disclosure and is merely meant to be illustrative of one possible interface.

Each transaction or request for data may be associated with a specific entity. Such an association may be manifest directly or indirectly in the transaction or the request itself. For example, in some embodiments, an entity may correspond with a customer of the data service. In such embodiments, the association of the customer with a transaction or request may be manifest directly through, for example, a customer identifier that is included in the transaction or the request. In other embodiments, the association of the customer with a transaction or request may be manifest indirectly by correlating a source of the transaction or the request with the customer. For example, with respect to a transaction, the transaction may be received from an application associated with the customer. Such an association may be maintained, for example, in an application-customer mapping that correlates applications with respective customers. Returning to the HTTP POST example above, the URL could act to associate the data with a respective entity.

System 200 includes queue router 208. Queue router 208 comprises processes configured to distribute transactions of the incoming live data stream 202 to respective dynamic queue nodes 224*a*-224*c*. As live data stream 202 enters system 200 through input interface 206, the individual transactions of the live data stream 202 are initially directed to queue router 208. In embodiments, queue router 208 is configured to analyze each transaction of the live data stream 202 to determine an identifier of an entity associated with the respective transaction. Queue router 208 then utilizes the identifier of the entity to determine if an existing one of the dynamic queue nodes 224*a*-224*c* is associated with the entity. This may be accomplished by referencing queue-entity mapping 244. Queue-entity mapping 244 lists each existing dynamic queue node within system 200 correlated with a respective entity. For instance, the entity could be a customer and the customer could be associated with the transaction by way of a customer identifier included in the transaction. Queue router 208 may then utilize the customer identifier, in conjunction with the queue-entity mapping 244, to determine whether an existing dynamic queue node has been assigned to that entity.

As depicted, each dynamic queue node 224*a*-224*c* includes a respective queue manager 226*a*-226*c*, a respective live data queue 228*a*-228*c*, an optional transaction processor 230*a*-230*c*, and is coupled with a respective partition 220*a*-220*c*, containing a respective stale data queue 222*a*-222*c* and state data 246*a*-246*c*, that concerns the state of the respective dynamic queue node 224*a*-224*c*. Each of these components will be respectively referred to collectively as dynamic queue node 224, queue manager 226, live data queue 228, transaction processor 230, partition 220, stale data queue 222, and state data 246. Transaction processor may also be referred to herein as a data server node.

If an existing dynamic queue node has not been assigned to that entity, then queue router 208 may instruct queue instantiator 242 to instantiate a new dynamic queue node to process the received transactions or requests associated with that entity. The queue instantiator 242, in some embodiments, initializes all of the individual components of the new dynamic queue node. For example, as depicted, queue instantiator 242 would initialize a queue manager for the new dynamic queue node. This may be accomplished, for example, by merely instantiating a new instance of a queue manager application. Queue instantiator 242 would also initialize a live data queue for the new dual-queue node along with a transaction processor to operate on the live data queue. This may be accomplished, for example, by allocating a portion of memory to serve as the live data queue and instantiating a new instance of the transaction processor.

Queue instantiator 224 may also initialize a partition of persistent data store 232 to serve as the stale data queue and in which to store any state data associated with the new dynamic queue node. If a partition already exists, this may be accomplished by identifying the partition of persistent data store 232 associated with the entity and associating the partition with the new dynamic queue node to serve as the stale data queue. If the partition does not already exist, the queue instantiator 242 may allocate a new partition in persistent data store 232 and associate the new partition with the new dynamic queue node. Associating the partition with the new dynamic queue node may be accomplished, for example, by loading an identifier associated with the partition into the newly instantiated queue manager. Queue instantiator 242 would then update the queue-entity mapping data 244 accordingly to include the new dynamic queue node and the associated entity.

In some embodiments, queue instantiator 242 may merely initialize the queue manager for the new dynamic queue node. In such embodiments, the queue manager may be configured to initialize the remaining components of the new dynamic queue node. In some embodiments, each queue router 208 is integrated with its own queue instantiator 242, as opposed to being a separate component, as depicted. In an embodiment, the queue instantiator 242 monitors system resources in system 200, and/or accesses data supplied by queue monitor 236, discussed in detail below, to determine where to instantiate a new dynamic queue node.

If an existing dynamic queue node has been assigned to that entity, then queue router 208 can route the transaction to that dynamic queue node for processing. In dynamic queue node 224, the queue manager 226 receives transactions from queue router 208. The queue manager 226 can assign a transaction identifier (ID), such as a Universally Unique Identifier (UUID), to each received transaction. A transaction identifier can uniquely identify a transaction in the dynamic queue node 224. The queue manager 226 can additionally store transactions in a stale data queue 222 in association with the assigned transaction IDs. In various implementations, a copy of each transaction received by the queue manager 226 is stored in the stale data queue 222 on persistent data store 232. Persistent data store 232 may be any type of non-volatile storage device, such as, for example, a hard disk, or any other non-volatile storage device discussed herein. The stored copy of a transaction can then be referred to as stale transaction data, or merely stale data.

The queue manager 226 also pushes, or loads, the received transactions to the live data queue 228 as live transaction data. In some cases, the queue manager 226 pushes all received transactions to the live data queue 228 as live transaction data. The queue manager 226 may push the received transactions to the live data queue 228 in a First in First Out (FIFO) manner (i.e., in a sequence that the transactions were received), by way of example. Although dynamic queue node 224 is depicted as including one live data queue, it will be appreciated that other implementations may employ multiple live data queues that can operate in parallel.

The live data queue 228 stores at least some of the live transaction data that are pushed to it by the queue manager 226. In embodiments, the transactions are stored in association with the corresponding transaction identifiers in the live data queue 228. At least some of the live transaction data that are stored in live data queue 228 may eventually be sent to output interface 240, where they can be provided to a destination node as live transaction data, via an in-memory data path (e.g., without going through stale data queue 222). However, as later described in additional detail, for various reasons, at least some live transaction data that are stored in the live data queue 228 may not be provided to the destination node as live transaction data, via the in-memory data path. Those transactions may instead eventually be provided to the destination node as stale transaction data from the stale data queue 222. Additionally, as described below, not all transactions that are pushed to the live data queue 228 are accepted and stored by the live data queue 228. These transactions also may be provided, by way of live data queue 228, to output interface 240 as stale transaction data from stale data queue 222. Put another way, the stale transaction data from stale data queue 222 may be provided to live data queue 228, which would The live data queue 228 may not accept and store live transactions from the queue manager 226 for any of a variety of reasons. In the present implementation, transactions that are accepted and stored by live data queue 228 fill live data queue 228. However, live data queue 228 would be limited in how much data can be stored therein at any given time. In some embodiments, the limit is defined as a number of transactions, such as 20,000 transactions. However, the limit could be defined in other ways and also could be subject to other variables. Thus, live data queue 228 may not accept and store one or more transactions when live data queue 228 has reached its capacity. Instead, the one or more transactions may be dropped as live transaction data, and may later be sent to output interface 240, by way of live data queue 228, as stale transaction data using the copy of the transaction stored in stale data queue 222.

An illustrative situation that may arise and result in live data queue 228 having been filled up to a limit is where dynamic queue node 224 is receiving transactions faster than the transactions can be sent through the in-memory data pathway. For example, queue manager 226 may be pushing transactions to live data queue 228 faster than live data queue 228 can send transactions to output interface 240 to create space for the pushed transactions. Thus, the pushed transactions may be dropped as live transaction data. However, in accordance with various aspects of the present disclosure, the pushed transactions may later be sent as stale transaction data, by way of live data queue 228, via stale data queue 222.

Live data queue 228 can send transactions to output interface 240 in response to a request (e.g., data requests 238) being received by input interface 206 of system 200. Such a request may be considered a pull request. Pull requests can be for a number of transactions (e.g., as specified by the request or determined by dynamic queue node 224). For example, a pull request can specify a number of transactions requested for a response to the pull request. Thus, the number of transactions could vary between pull requests. If live data queue 228 is filled with at least the number of transactions being requested, a response to the pull request that is provided using output interface 240 can include that number of transactions from live data queue 228. If live data queue 228 is filled with more than the number of transactions being requested, transactions may remain in live data queue 228 for a subsequent pull request, or until the dynamic queue node is terminated, as discussed below. Where transactions remain, those transactions may be pushed forward in the live data queue of the present implementation (i.e. live data queue 228), as queue manager pushes additional transactions to live data queue 228.

Optionally, the remaining transactions could be removed and/or deallocated from live data queue 228. An example of the remaining transactions optionally being removed and/or deallocated from live data queue 228 is where queue manager 226 empties all transactions from live data queue 228, as is later described in additional detail below. These remaining transactions may later be sent to output interface 240, by way of live data queue 228, as stale transaction data from stale data queue 222.

Where live data queue 228 is filled with less than the number of transactions being requested, in various implementations, the response to the pull request can include one or more transactions from stale data queue 222, in addition to the transactions from live data queue 228. For example, queue manager 226 may push the additional transactions to stale data queue 222. The amount of transactions included from stale data queue 222 can be such that the number of transactions (or optionally any limit) for the pull request is not exceeded. Any transactions that may possibly remain in stale data queue 222 can be treated in any of the various ways that have been described with respect to remaining transactions in live data queue 228 (i.e., de-allocated, removed, or eventually pushed forward by additional transactions).

Thus, from the foregoing, it will be appreciated that a response to a pull request can include a combination of live transaction data and stale transaction data. Furthermore, live transaction data from live data queue 228 is generally prioritized over stale transaction data being included in a response to a pull request. In particular, in various implementations, the stale transaction data is included where there is headroom to reach a limit on the number of transactions in a response to a pull request. The headroom remains after including all available live transaction data from live data queue 228 and/or the live data pipeline.

Thus, in some cases, transactions from stale data queue 222 are utilized in a response to a pull request if the response is large enough to empty live data queue 228. In this respect, destination nodes (e.g., customer devices 110a-110c) may increase the number of transactions being requested as appropriate so as to increase the likelihood that stale transaction data is acquired. Furthermore, in low traffic scenarios, where live data queue 228 is not receiving transactions fast enough to be filled when responding to a pull request, headroom may typically be available to include at least some stale transaction data from stale data queue 222 in a response.

It is noted, however, that stale data queue 222 may not necessarily include any transactions in the aforementioned scenarios. For example, the transactions may not have been stored in stale data queue 222 when needed for a response to a pull request or no transactions may be available to store in stale data queue 222. No transactions may be available, for example, where the throughput of the dynamic queue node 224 has remained sufficiently high to send received transactions to destination nodes as live transaction data, and where the destination nodes are successfully receiving the transactions. In this case, transactions are quickly being forwarded by dynamic queue node 224 as live transaction data by way of the live data pipeline.

In accordance with additional aspects of the present disclosure, destination nodes that receive transaction data from dynamic queue node 224 can acknowledge the receipt of the data. Acknowledgments can correspond to stale transaction data and/or live transaction data. Queue manager 226 can log the acknowledgments in an acknowledgment log of state data 246. In logging an acknowledgment, queue manager 226 may store transactions with their associated transaction IDs, or may only store the associated transaction IDs. Thus, queue manager 226 can provide entries in the acknowledgment log that correspond to acknowledged transactions. In some instances, queue manager 226 can modify transactions in stale data queue 222 based on the acknowledgments, such as by deleting corresponding transactions therein. More particularly, the transactions may no longer be needed by dynamic queue node 224 after they have been acknowledged, and therefore may be deleted based on corresponding acknowledgements. As illustrated, acknowledgment log in state data 246 and stale data queue 222 are maintained in separate files. The separate files are each stored in non-volatile storage (e.g., persistent data store 232). It is noted that other configurations, such as a composite file for acknowledgements and transactions, are possible.

In some implementations, any destination nodes are configured to acknowledge receiving transactions from output interface 240. For example, an acknowledgment can be sent based on receiving a response to a pull request. In some respects, an acknowledgment from a destination node can specify transaction identifiers of transactions that were received by the destination node. Acknowledgments of the specified transactions can be stored in an acknowledgment log of state data 246 by queue manager 226. In some implementations, an acknowledgment corresponds to a close connection communication, where the close connection communication corresponds to a response to a pull request. Based on the correspondence, queue manager 226 can determine which transactions to record as being acknowledged in the acknowledgment log of state data. In this way, queue manager 226 can synchronously record acknowledgments for transactions provided to destination nodes.

Accordingly, dynamic queue node 224 can log and store incoming transactions in stale data queue 222 and further log ones of those transactions that have been acknowledged as being received by one or more destination nodes in the aforementioned acknowledgment log. Queue manager 226 is configured to analyze stale data queue 222 and/or the acknowledgment log in state data 246 for transaction management purposes. For example, queue manager 226 can analyze stale data queue 222 and the acknowledgment log for unacknowledged transactions, which may be sent to output interface 240, by way of live data queue 228, as stale transaction data from stale data queue 222. Queue manager 226 can further determine which unacknowledged transactions to include in the stale data pipeline(s) and/or the order in which to include those transactions.

In some respects, queue manager 226 can provide stale transaction data from stale data queue 222 to live data queue 228. In doing so, queue manager 226 may periodically execute various functions to fill live data queue 228 with stale transaction data. The transactions that are used to fill live data queue 228 can be unacknowledged transactions.

Queue manager 226 may identify each transaction as being an unacknowledged transaction where the transaction is in stale data queue 222, but does not have a corresponding recorded acknowledgment in an acknowledgment log. In some respects, queue manager 226 may optionally take various steps to prevent duplicate data from being forwarded by dynamic queue node 224 as a consequence of this approach. For example, in some cases, transactions are still being stored by queue manager 226 in stale data queue 222 and acknowledgements are still being recorded by queue manager 226 both as new information. In such cases, the stale data queue 222 and acknowledgement logs used by queue manager 226 to discover unacknowledged transactions are closed to this new information so that this new information does not accidentally result in duplicate data being forwarded. Thus, this new information may be stored in a newly allocated stale data queue and a newly allocated transaction log in stale data. Later, at least a portion of the transactions from the closed transaction and acknowledgment logs may be merged with the new transaction and acknowledgement logs (e.g., transactions that were not sent).

Transaction processor 230 may operate on transactions within live data queue 228. Transaction processor 230 is a set of one or more processes, executed by processors or other suitable components within each of the dynamic queue nodes, that performs data operations with respect to one or more data collections (e.g., Collections A-C), along with associated in-memory data structures that support the data operations. A transaction processor 230 is said to be assigned to the collection with respect to which it performs data operations.

A transaction processor 230 performs data operations in response to receipt of transaction data or data requests received by system 200. Data requests 238 may take any suitable form, depending on the embodiment. For instance, in an embodiment, data requests 238 may be formatted as Hypertext Terminal Protocol (HTTP) GET requests. In another embodiment, data requests 238 may take the form of statements in a query language such as Structured Query Language (SQL). Depending on the embodiment, a data request 238 may cause transaction processor 230 to perform any type of data operation that is applicable to the data collection to which the transaction processor 230 is assigned. In an embodiment, transaction data may simply be a message, such as an event message or log message, that implicitly instructs the transaction processor 230 to process the message by performing one or more data operations with respect to data found within the message.

As a result of the performed operations, the transaction processor 230 may cause data within an assigned data collection to be updated, and/or return response data that comprises data retrieved from the assigned data collection or derived based thereon. Response data may be of any suitable structure, including without limitation the same structures in which the retrieved data is stored within the corresponding data collection, converted structures such as SQL result sets or eXtended Markup Language (XML) documents, or derived structures such as web pages or images analyzing or visualizing the retrieved data. In an embodiment, certain returned structures in response data are generated by applying the retrieved data to templates and/or formatting instructions.

As mentioned above, system 200 utilizes collection data store 234, which may be implemented upon one or more storage devices. The collection data store 234 comprises a plurality of data collections A-C. Each data collection may be a collection of data structures having a variety of forms, depending on the embodiment. For example, the data collections may comprise a collection of event data structures, a group of lines of tab-delimited data, a relational database, relational database table, set of XML elements, one or more files, any other suitable structure type, or any combination thereof. In an embodiment, different data collections within the collection data store 234 may support different data structure types. In an embodiment, a data collection comprised of any of the foregoing data structures is augmented with system-defined and/or user-defined variables that can be updated to describe certain characteristics of the data stored in the data collection. Examples of such variables may include counters or metrics.

Each data collection may be associated with collection configuration data that may be stored within the collection, or stored as a separate file. Such collection configuration data describes various aspects of its associated collection, such as one or more identifiers for the collection, a number of fields found within the collection, a maximum collection size, and so forth.

In an embodiment, each data collection is associated with a unique collection identifier that is assigned when the collection is created. Such an identifier may associate the collection with an entity, such as those described above. For example, the collection identifier could be a customer identifier, the name of a software application, an application key assigned to a software application or applications for which the data collection is maintained, an identifier of a project of a customer (e.g., combination of customer identifier and, or any other suitable collection identifier. While only three data collections are explicitly depicted, collection data store 234 may comprise any number of data collections, limited by a size of the collection data store 234. In an embodiment, each data collection is stored redundantly on multiple data storage devices, such as those discussed elsewhere herein, and synchronized there-between.

In an embodiment, each dynamic queue node 224 executes in an isolated mode, meaning that each dynamic queue node 224 operates independently of the other dynamic queue nodes 224, even if collocated on the same computing device. Thus, if one dynamic queue node 224 crashes, the remaining dynamic queue nodes 224 will be unaffected. In an embodiment, one technique for ensuring isolation is to execute each dynamic queue node 224 within a separate system runtime, although any other suitable isolation technique may be utilized.

In an embodiment, each dynamic queue node 224 is an instantiation of the same execution logic, meaning that each dynamic queue node 224 operates in essentially the same manner, but with respect to different live data or requests. In other embodiments, some dynamic queue nodes 224 may execute different execution logic than other dynamic queue nodes 224. For instance, state data 246 may include parameters that impact how a dynamic queue node 224 operates. As another example, system 200 may support different pre-defined types of dynamic queue nodes 224, each type supporting different operation sets and/or outputting data in different manners. The type of dynamic queue node 224 used for an entity may be assigned, for instance, by the parameters stored in state data 246. In an embodiment, these parameters may specify that a dynamic queue node 224 use certain data processing instructions for certain operations, while other parameters in other state data cause another dynamic queue node 224 to utilize other data processing instructions for the certain operations. For instance, state data 246 may optionally be linked to files that contain custom instructions for processing certain types of commands.

System 200 further comprises one or more queue monitors 236. A queue monitor 236 monitors existing dynamic queue nodes 224 to determine whether the dynamic queue nodes 224 are active or inactive. Queue monitor 236 instructs or otherwise causes inactive dynamic queue nodes 224 to terminate. Queue monitor 236 also updates the queue-entity mapping 244 to remove any mappings to terminated dynamic queue nodes 224. In embodiment, queue monitor 236 preserves data existing in collection data store (e.g., collections A-C) and persistent data store 232 (e.g., stale data queue 222 and state data 246) for the dynamic queue nodes 224 that are terminated.

Depending on the embodiment, different criteria may be used to determine when a dynamic queue nodes 224 has become inactive. In an embodiment, for example, a dynamic queue node 224 becomes inactive when it has not received a transaction from the live data stream 202 and/or a request from data requests 238 within a certain period of time. Queue monitor 236 may have access to state data 246 and/or may communicate with queue router 208 and/or dynamic queue nodes 224 to make this determination. The certain period may be of a global value, or the certain period may be set on a per entity basis based on factors such as, the size of the stale data queue 222, size of collections A-C, expected usage patterns, and so forth.

In an embodiment, the period of time is predefined in, for instance, the state data 246. In an embodiment, the period of time may be adjusted dynamically through various learning processes. For instance, if, within a relatively quick period of time after a dynamic queue node 224 has been terminated, a new dynamic queue node 224 must be instantiated associated with the entity, the learning process may adjust the predefined period to be longer. In an embodiment, the period of time after which a dynamic queue node 224 becomes inactive may be a function of how busy system 200 is. Hence, under heavy server loads, a dynamic queue node 224 may become inactive more quickly than under lighter server loads.

In an embodiment, inactive dynamic queue nodes 224 are terminated immediately. In another embodiment, queue monitor 236 maintains a prioritized queue of inactive dynamic queue nodes. When utilization of resources (e.g., memory) reaches a certain threshold (e.g. amount or percentage available or used), and/or when more resources are needed, queue monitor 236 may select one or more of the inactive dynamic queue nodes 224 to terminate from the queue. The queue may be prioritized based on a variety of factors, such as for how long a dynamic queue node 224 has been inactive, usage trends, predefined weights indicating an importance for each entity or payments received from each entity, a size of the stale data queue, and so forth. In such embodiments, if a dynamic queue node 224 receives a new transaction or data request, the dynamic queue node 224 becomes active and is removed from the queue of inactive dynamic queue nodes. In an embodiment, once a dynamic queue node 224 is added to the queue, the dynamic queue node, or more specifically the queue manager, may be instructed to dump its live data queue so that the dynamic queue node 224 may be terminated more quickly, if needed. In yet other embodiments, queue monitor 236 maintains a prioritized list of active dynamic queue nodes 224, based on the above factors. When resources are needed, a certain number of lowest priority dynamic queue nodes 224 are designated as inactive, and thus terminated, or may be migrated to another system having more available resources. Such a migration is discussed in greater detail herein.

In an embodiment, each dynamic queue node 224 comprises its own queue monitor 236. Hence, each dynamic queue nodes 224 is configured to register itself in the queue-entity mapping 244 and/or to terminate itself after a certain period of inactivity. In other embodiments, queue router 208 may comprise a queue monitor 236. In yet other embodiments, there is a separate and distinct queue monitor 236 per system or server, that monitors each dynamic queue node 224 on the system or server.

Output interface 240 is utilized by dynamic queue node to send transactions or other requested data (e.g., data from collections A-C) to a destination node (e.g., client devices 110*a*-110*c*). Transactions can be sent using output interface 240 in any of a variety of possible formats to send the transactions to at least one of the destination nodes. In some implementations, a group of transactions is sent, for example, in a response to a pull request received by input interface 206. The group of transactions may be sent in a response to the pull request, discussed previously, to one or more of the destination nodes, for example, which may or may not have made the pull request. In some implementations, the response to the pull request is sent to the destination node that made the pull request based on the pull request being from that destination node.

Mention is made throughout this disclosure of a single tenant data system. A single tenant data system may include many of the previously mentioned components; however, because there is only a single tenant, queue router 208 would not be needed and may be omitted. As such, input interface 206 would be coupled directly with a single dual-queue node. In addition, because queue nodes would not be instantiated or terminated, the queue instantiator and the queue-entity mapping may also be omitted. Furthermore, there could only be one partition in persistent data store 232 and one collection in collection data store 234.

Figure 3:
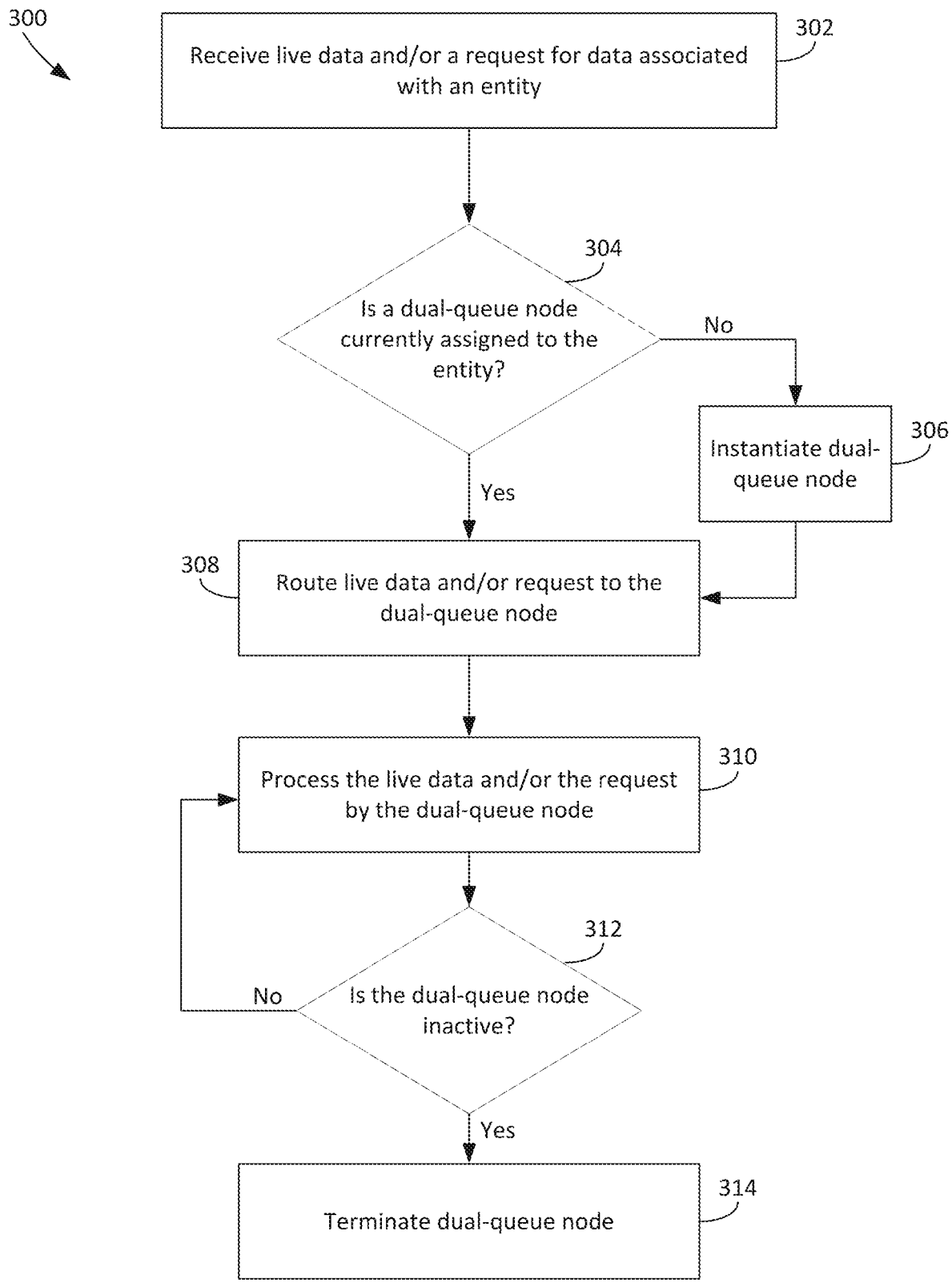
FIG. 3 depicts an illustrative process flow for dynamically instantiating a dual-queue node, in accordance with various embodiments of the present disclosure.

FIG. 3 depicts an illustrative process flow 300 for dynamically instantiating a dual-queue node, in accordance with various embodiments of the present disclosure. The process flow begins at block 302 where a multi-tenant dual-queue system of a data service, such as, for example, system 200 of FIG. 2, receives live data and/or a request for data associated with an entity. In embodiments, the live data would be received by, for example, input interface 206 discussed above in reference to FIG. 2. Also as discussed above, live data refers to real-time data or data in-motion and may comprise one or more transactions. The request for data may be a request for previously received live data that is stored in a stale data queue, such as stale data queue 222, associated with the entity.

In either the one or more transactions of the received live data or the request, the entity may be associated directly or indirectly. This association may be manifest directly in the one or more transactions or the request for data by including an identifier that identifies the entity, or indirectly by including an identifier that bears some association with the entity in the one or more transactions or the request for the data.

In some embodiments, the entity may be a customer of the data service and the transactions or request for data may include an identifier that directly identifies the customer. In other embodiments, the entity may be a customer of the data service and the transactions or request for data may include an identifier of a source of the data, such as an application that generated the data, where the source is associated with the customer (e.g., by way of a table or other mapping) and thus indirectly identifies the customer. In further embodiments, the customer may be a provider of the application from which the live data is received, and the live data may concern performance or usage of the application. In other embodiments, the entity may be based on the customer and one or more other aspects of the live data. For example, the customer may desire to have different repositories such as, for example, one for each application of a plurality of applications provided by the customer, one for specific types of data of special interest to the customer, or any other type of delineation the customer would like. In such embodiments, the entity may be a combination of the customer and the delineation, such as, for example, application identifiers, types of data, etc.

In some embodiments the entity may be based on a device from which the live data is received. For example, the entity could be related to an Internet of things (IOT) device, such as, for example, a smart metering device, smart automotive sensors, biochip transponders, heart monitoring implants, connected devices, etc. IOT devices generally include any data collection devices that operate without regular human intervention to seamlessly report the data collected. These devices may operate over long distances on cellular networks or via the Internet, but may operate in local cells via wireless personal area network protocols, such as, for example, Zigbee. In such embodiments, the device may be identified directly in the one or more transactions via a device identifier, such as a service set identifier (SSID) assigned to the device that is included in the one or more transactions. The device may also be identified indirectly via, for example, the data produced by the device that is included in the one or more transactions.

Moving on to block 304, a determination is made as to whether a dual-queue node, such as dynamic queue node 224, is currently assigned to the customer on the multi-tenant dual-queue system. This may be accomplished by referencing queue-entity mapping data, such as queue-entity mapping 244, that relates each of the currently instantiated dual-queue nodes on the multi-tenant dual-queue system with a respective entity. If a dual-queue node is currently assigned to the entity, then the process flow may proceed to block 308. If, however, a dual-queue node is not currently assigned to the entity, the process flow may proceed to block 306 where a dual-queue node is instantiated and assigned to the entity to process the received live data or service the received data request. The actual instantiation of a dual-queue node is discussed in greater detail in reference to FIG. 4, and elsewhere herein.

At block 308 the live data and or the request for data may be routed to the dual-queue node assigned to the entity. This can be accomplished, for example, by queue router 208 discussed above. At block 310, the live data may be processed by the dual-queue node or the data request may be serviced by the dual-queue node as discussed elsewhere herein.

Once the live data is processed or the data request has been serviced, the process may proceed to block 312 where a determination is made as to whether the dual-queue node is active or inactive. Depending on the embodiment, different criteria may be used to determine when a dual-queue node has become inactive. In an embodiment, for example, a dual-queue node becomes inactive when it has not received live data and/or any data requests within a certain predefined or preconfigured period of time.

The certain period may be of a global value, or the certain period may be set on a per entity basis based on factors, such as, for example, the amount of data stored in the stale data queue of the dual-queue node, expected usage patterns, and so forth. The certain period of time may be adjusted dynamically through various learning processes implemented in the multi-tenant dual-queue system. For instance, if, within a relatively quick period of time after a dual-queue node is terminated, a new dual-queue node must be instantiated for the entity, the learning process may adjust the predefined period to be longer. In an embodiment, the period of time after which a dual-queue node becomes inactive may be a function of how busy the multi-tenant system is and/or a function of available resources on the multi-tenant system. Hence, under heavy server loads, a dual-queue node may become inactive more quickly than under lighter server loads.

If the dual-queue node is still active, the process may return to block 310 where any additional live data is processed or data requests are serviced. If, however, dual-queue node is determined to be inactive, the process proceeds to block 314 where the dual-queue node is terminated. This may be accomplished by terminating any memory/processor based processes and may leave only the stale queue portion of the dual-queue intact, along with any state data associated with the dual-queue node to enable a new dual-queue node to be instantiated at a later time, but pick up where the previous dual-queue node left off. In addition, in embodiments utilizing queue-entity mapping data, the queue-entity mapping data would be updated to remove the terminated dual-queue node from the queue-entity mapping data.

In an embodiment, inactive dual-queue nodes are terminated immediately at block 314, as described above. In another embodiment, the dual-queue node may be added to a prioritized queue of inactive dynamic queue nodes. When utilization of resources (e.g., memory) reaches a certain threshold (e.g. amount or percentage, available or used), and/or when more resources are needed, one or more of the inactive dual-queue nodes 224 are selected from the prioritized queue to be terminated. The queue may be prioritized based on a variety of factors, such as for how long a dual-queue node has been inactive, usage trends, predefined weights indicating an importance for each entity or payments received from each entity, a size of the stale data queue, and so forth. In such embodiments, if a dual-queue node receives a new transaction or data request, the dual-queue node becomes active and is removed from the queue of inactive dual-queue nodes. In an embodiment, once a dual-queue node is added to the queue, the dual-queue node, or more specifically a queue manager of the dual-queue node, may be instructed to dump its live data queue so that the dual-queue node may be terminated more quickly, if needed.

Figure 4:
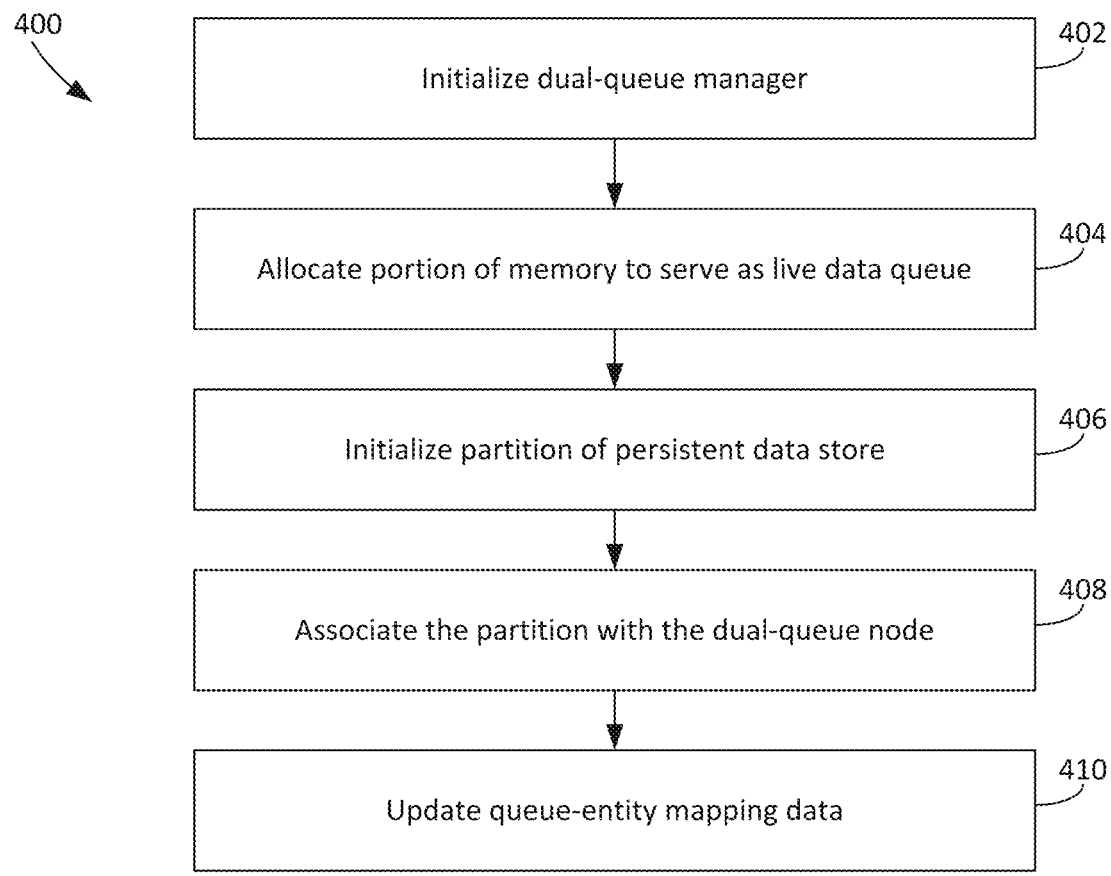
FIG. 4 depicts a more detailed process flow of one or more processes of FIG. 3, in accordance with various embodiments of the present disclosure.

FIG. 4 depicts a more detailed process flow 400 for block 306 of FIG. 3, in accordance with various embodiments of the present disclosure. If a dual-queue node has not been assigned to the entity, then a component of the multi-tenant dual-queue system, such as queue instantiator 242, may instantiate a new dual-queue node according to process flow 400. Process flow 400 begins at block 402 where a dual-queue manager, such as queue manager 226, is initialized. This may be accomplished, for example, by merely instantiating a new instance of a queue manager application.

At block 404, a portion of memory may be allocated to serve as a live data queue for the dual-queue node. The amount of memory allocated may, in some embodiments, be entity specific. For example, an entity that requires more data processing capacity may be allocated a larger portion of memory than an entity that does not require as much data processing capacity. In other embodiments, the amount of memory allocated may be based on available resources of the multi-tenant system. For example, if the multi-tenant system is under a heavy server load then less memory would be allocated than would be if the server were under a light server load.

At block 406, a partition of persistent memory is initialized to serve as a stale data queue of the dual-queue node. If a partition already exists, this may be accomplished by identifying the partition associated with the entity and associating the partition with the dual-queue node to serve as the stale data queue. If the partition does not already exist, then a new partition is allocated in persistent memory. Persistent memory includes any of the non-volatile storage devices mentioned herein, or combinations thereof.

At block 408, the initialized partition is then associated with the dual-queue node. Associating the partition with the dual-queue node may be accomplished by loading an identifier associated with the partition into the newly instantiated queue manager. Finally queue-entity mapping data would be updated at block 410 to include the newly instantiated dual-queue node and a correlation to the entity associated therewith.

Figure 5:
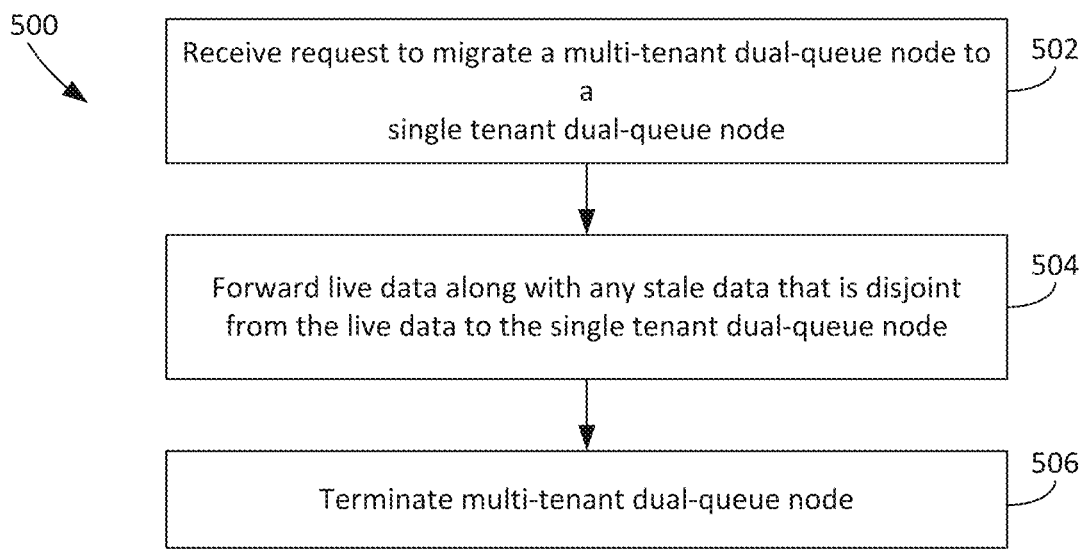
FIG. 5 depicts an illustrative process flow for migrating a dual-queue node from a multi-tenant system to a single tenant system, in accordance with various embodiments of the present disclosure.

FIG. 5 depicts an illustrative process flow 500 for migrating a dual-queue node from a multi-tenant system to a single tenant system, in accordance with various embodiments of the present disclosure. Because of the previously discussed varied resource allocation between multi-tenant systems and single tenant systems, it will be appreciated that the multi-tenant systems generally offer a cost advantage on a per customer basis in addition to offering greater scalability than the single tenant systems. Alternatively, it will also be appreciated that the single tenant systems would typically offer greater or more consistent performance at a greater cost and less scalability. As such, a data service may offer a potential customer wishing to try out the services offered by data service 102 a free, or reduced cost, trial period on the multi-tenant dual-queue systems 106 without the cost to the data service 102 of having to implement a single tenant dual-queue system for such a trial. This would also enable the data service to offer lower cost solutions to current customers that may not need the single tenant system. The data service may offer these trial/lower-cost options in the hope that the customer would decide to subscribe to a single tenant solution in the future. Should the customer decide to subscribe to the single tenant solution in the future, then it may be desirable to have the ability to migrate the customer from the multi-tenant system to the single tenant system. Such a process starts at block 502 where a request is received to migrate data from a multi-tenant system to a single tenant system associated with the entity. In response to the request, a dynamic dual-queue node from the multi-tenant system would be instantiated, unless a dual-queue node is already associated with the entity on the multi-tenant system. This process would be similar to that described in reference to FIG. 3 where a data request is made.

At block 504, the dual-queue node would forward live data, if any is received while servicing the migration request, along with any stale data that is disjoint from the live data to the single tenant system. As used herein, disjoint is utilized as it would be in the art to recognize data in one set that does not exist in another set. As such, said another way, stale data that is disjoint from the live data would include any stale data that is not included in the live data. This would ensure that duplicate data is not transmitted to the single tenant system. In addition to the live data and disjoint stale data, any state data, and/or the previously discussed collections, may also be forwarded to the single tenant system.

At block 506, the dual-queue node for the entity on the multi-tenant system is terminated. This termination would be similar to the termination of an inactive queue, except that any data residing within a persistent repository would also be deleted as it would be unnecessarily consuming resources of the persistent repository.

Figure 6:
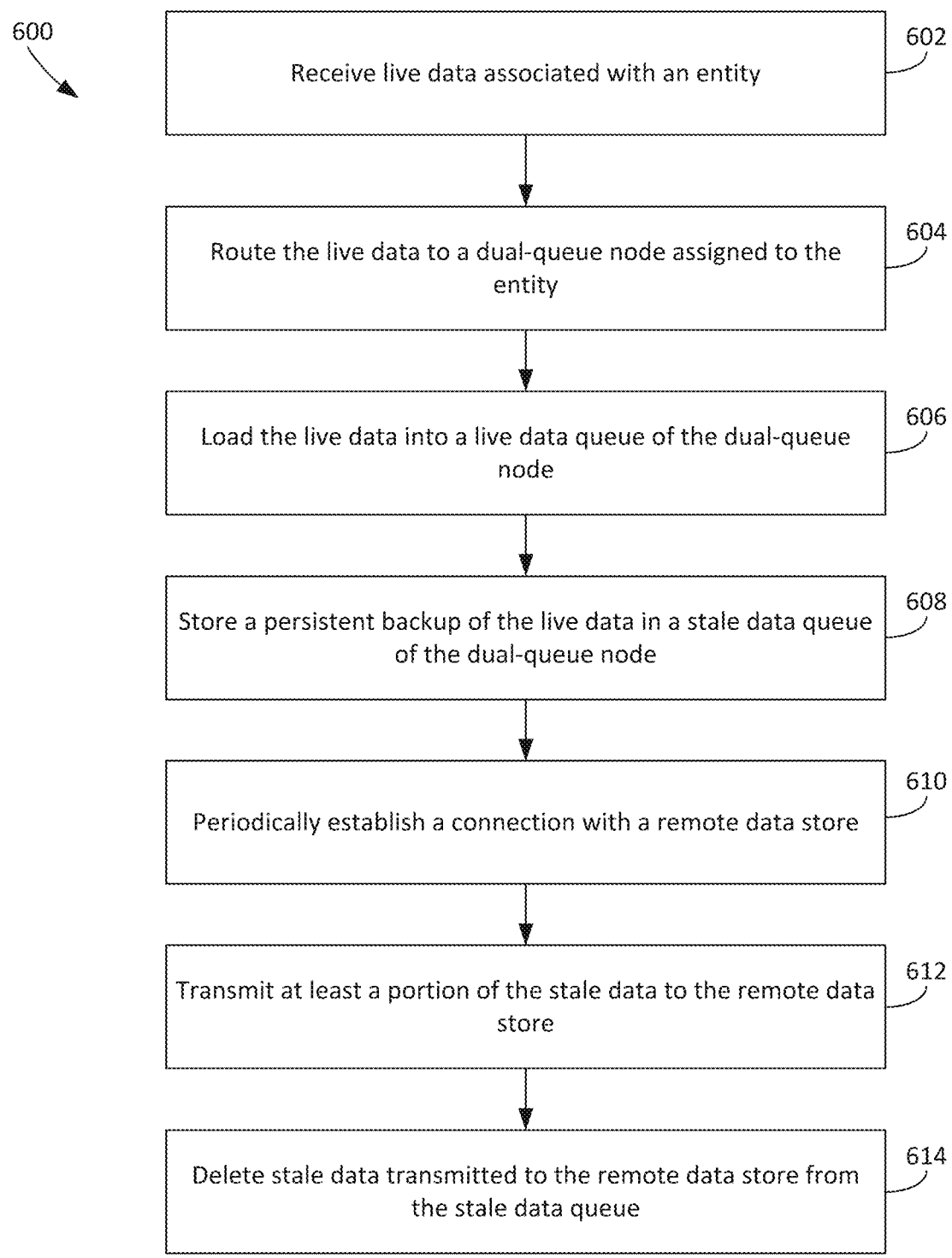
FIG. 6 depicts an illustrative process flow for moving data to an external data store where the external data store is only periodically, or ephemerally, in communication with the data service.

FIG. 6 depicts an illustrative process flow 600 for moving data to an external remote data store where the external remote data store is only periodically, or ephemerally, in communication with the data service. In some embodiments, an entity may only be able to periodically, or ephemerally, connect with a dual-queue system to access data associated with the entity. This may be the case whether the dual-queue system is a single tenant dual-queue system or a multi-tenant dual-queue system. This may be of particular concern to a customer of the data service, such as, for example, an independent software developer, that may only periodically be connected with the data service, as the received data would continue to build up in the stale data queue during the period in which the customer has yet to download. In the single tenant dual-queue system, the data service could offer the customer additional persistent storage space, or could automatically implement additional persistent storage space seamlessly without the customer even realizing that the amount of persistent storage space has been increased. In the multi-tenant solution, however, one of the concerns is resource utilization. As such, it may be desirable to enable portions of the stale data to be transmitted to these periodically connected remote data stores to reduce the amount of data that persists in the stale data queue.

Such a process is depicted by process flow 600. Process flow 600 may begin at block 602 where live data associated with an entity is received. At block 604, the live data is routed to a dual-queue node assigned to the entity. In a multi-tenant system, this process would be similar to that discussed in reference to FIG. 3. At block 606, the live data may be loaded into a live data queue of the dual-queue node. At block 608, a persistent backup of the live data may be stored in a stale data queue of the dual-queue node. Because there may be no remote data store to which to transmit the live data loaded into the live data queue, the live data queue may be flushed once the live data is fully processed, for example by transaction processor 230. After the live data is flushed, the dual-queue node would merely store the copy of the live data as stale data in the stale data queue. In a multi-tenant dual-queue system, the dual-queue node would then be terminated once it becomes inactive, as discussed elsewhere herein.

At block 610, a data connection with the remote data store and the data service, more specifically the dual-queue node assigned to the entity, may be established. In some embodiments, such a data connection could be initiated by the data service, if, for example, the data service detects that the remote data store is currently on a network accessible to the data service, such as the Internet, for example. In other embodiments, such a data connection could be initiated by the entity, either by enabling the remote data store to automatically seek to establish a connection, or by manually initiating such a connection. In either case, in a multi-tenant system a dual-queue node may be instantiated for the entity associated with the remote data store, in a similar manner to that discussed elsewhere herein. The remote data store may be directly or indirectly associated with the entity in a similar manner to that discussed elsewhere herein in reference to transactions or data requests. Any of these embodiments may be enabled, for example, by an agent installed on the same device as the remote data store, or on a device coupled with the remote data store. The remote data store could be, for example, a hard drive of a laptop, or any other suitable persistent data storage device in communication with a suitable computing device, such as those persistent data storage devices and computing devices discussed elsewhere herein.

At block 612, at least a portion of the stale data is transmitted to the remote data store. This may be accomplished through a push mechanism initiated by the data service, or through a pull mechanism initiated by the device on which the remote data store resides or a device coupled with the remote data store. In some embodiments, the remote data store may be online for a long enough period of time to completely empty the stale data queue along with any live data that may have been received while the remote data store was connected with the data service. In other embodiments, the remote data store may only be connected to the data service for a long enough period of time to download a portion of the stale data in the stale data queue. In such embodiments, the transactions transmitted and received may be tracked utilizing, for example, the above discussed acknowledgement log that resides in state data 246. In some embodiments, summary statistics concerning the data being transmitted to the remote data store may concurrently be sent to the computing device on which the remote data store resides or to which the remote data store is coupled. These summary statistics may enable a customer/potential customer of the data service to view the summary statistics while the data is being sent to the remote data store, which may be time consuming for large amounts of data and/or slower data connections. These summary statistics are discussed in detail elsewhere herein.

At block 614, the data transmitted to the remote data store is deleted from the stale data queue. In some embodiments, this would be based on the above mentioned acknowledgment log to ensure any data that was not acknowledged by the remote data store, and thus lost in transmission, is not deleted.

Figure 7:
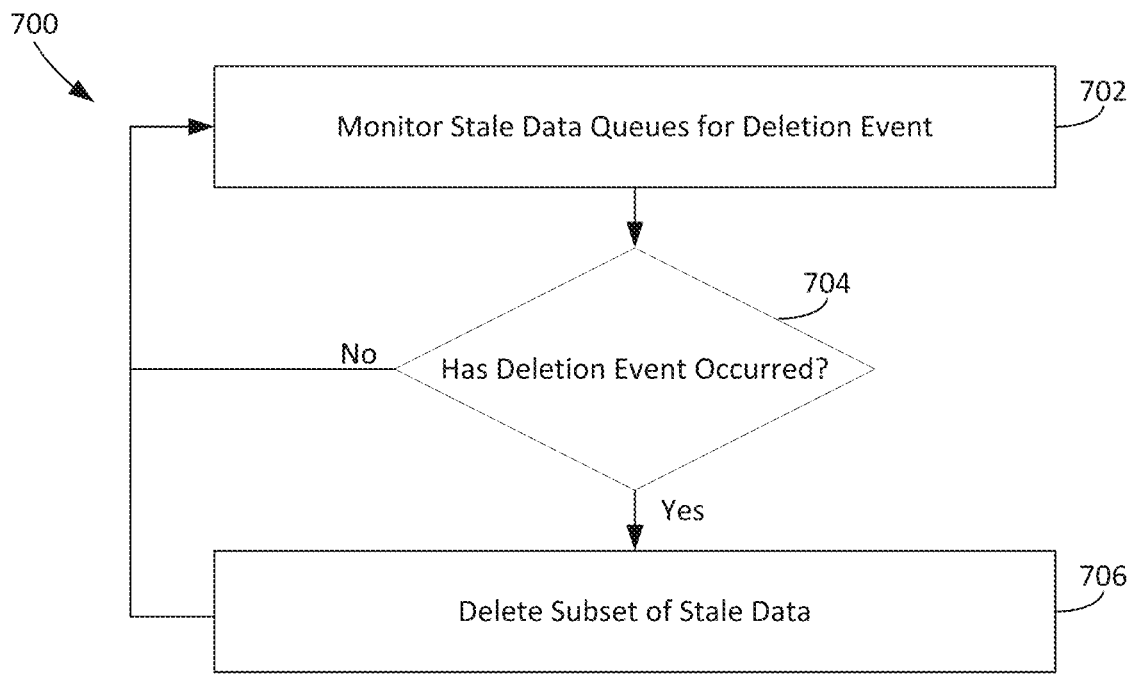
FIG. 7 depicts an illustrative process flow for monitoring a stale data queue for deletion events.

FIG. 7 depicts an illustrative process flow 700 for monitoring a stale data queue for deletion events. In embodiments where a remote data store is only able to periodically, or ephemerally, connect with a dual-queue system to access data associated with the entity, the data may continue to build in a stale data queue associated with the entity. As mentioned above, in a multi-tenant solution one concern is resource utilization. As such, it may be desirable to enable automatic deletion of portions of stale data associated with an entity in response to certain deletion events. This automatic deletion may be carried out, for example, by queue monitor 236. Such deletion events may be based, for example, on resource consumption. Such a process is depicted by process flow 700.

Process flow 700 begins at block 702 where a stale data queue is monitored for a deletion event. In embodiments, such a deletion event may be monitored by, for example, queue monitor 236. A deletion event may be any event that could indicate a need or reason for which to delete data from the stale data queue. Such an event may be, for example, whether stale data exceeds a threshold of age, whether the cumulative size of the stale data exceeds a threshold, whether an amount of available space in the stale data queue is at or below a predefined threshold, etc. These predefined thresholds may be entity-specific. For example, a potential customer on a trial period may have different thresholds than a customer that pays for the multi-tenant dual-queue system. These thresholds may also be adjusted dynamically through various learning processes implemented in the multi-tenant dual-queue system. In an embodiment, the thresholds may be a function of how busy the multi-tenant system is and/or a function of available resources on the multi-tenant system. Hence, under heavy server loads, a stale data queue may reach a deletion event more quickly than under lighter server loads.

At block 704, a determination is made as to whether or not a deletion event has occurred. If a deletion event has not occurred, then the process proceeds back up to block 702 and the monitoring would continue. If, however, a deletion event has occurred, in some embodiments, a subset of stale data is deleted at block 706. Such a subset may be determined by any suitable factor, such as, for example, age of the data so that the oldest data is deleted first, or a priority associated with subsets of the data. For instance, a customer may value certain data over other data. In such embodiments, the customer may be able to designate the certain data as having a higher priority than the other data. In some embodiments, a warning may be transmitted by the data service to the customer/potential customer, via email, for example. Such a warning may include an indication that the customer/potential customer has reached the deletion event; that the customer/potential customer should log in to download the stale data from the stale data queue; the amount of data deleted from the stale data queue; and/or summary statistics of at least the deleted data. Such summary statistics are discussed in detail elsewhere herein.

In some embodiments, rather than deleting the subset of stale data, a new stale data queue may be initialized. This may be accomplished by allocating a new stale data queue in a new partition of a persistent data store. In such embodiments, newly received live data would be backed up to the new stale data queue. The customer/potential customer may not gain access to data in the new stale data queue until the customer/potential customer downloads stale data from the previously allocated stale data queue, pays an access fee to access the data in the new stale data queue, or pays a storage fee to maintain the new stale data queue. In addition, a warning may be transmitted by the data service to the customer/potential customer, via email, for example. Such a warning may include an indication that the customer/potential customer has reached the deletion event and that the user should log in to download the stale data from the stale data queue. It will be appreciated that allocation of a new stale data queue may be limited by the resources available to the dual-queue system.

Figure 8:
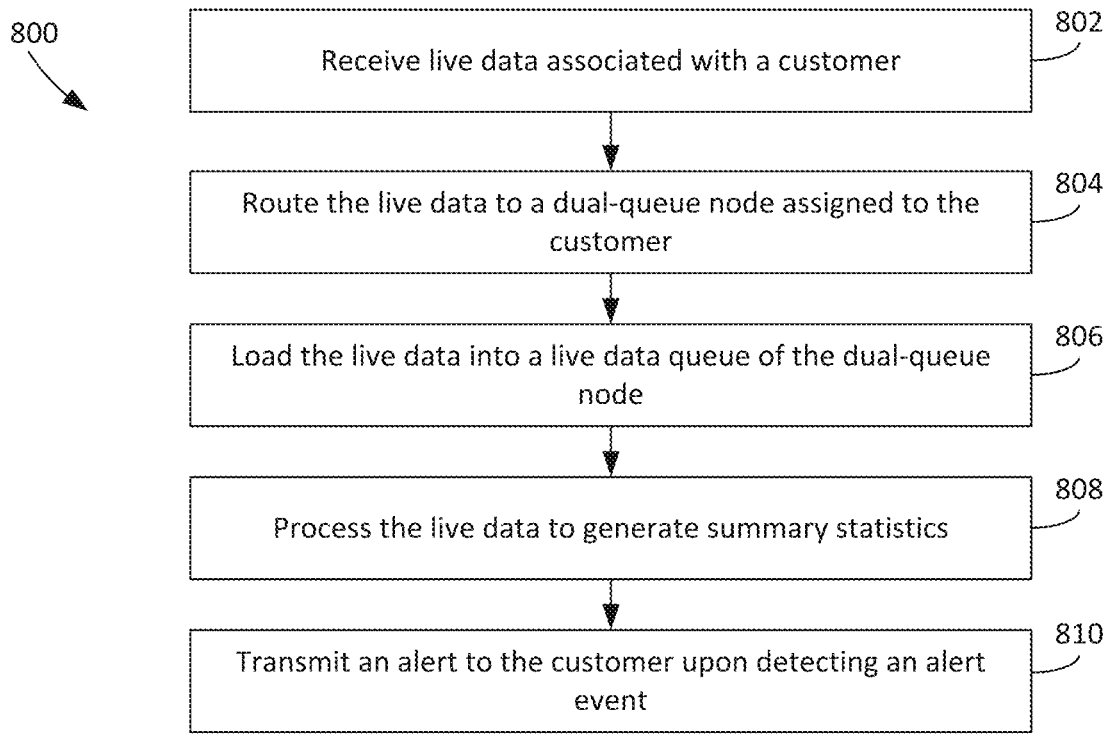
FIG. 8 depicts an illustrative process flow for alerting a customer upon detection of an alert event, in accordance with various embodiments of the present disclosure.

FIG. 8 depicts an illustrative process flow 800 for alerting a customer upon detection of an alert event, in accordance with various embodiments of the present disclosure. In embodiments, customers may subscribe to a data service as described herein, in addition potential customers may partake in a trial of the data service as discussed above in reference to dual-queue nodes on a multi-tenant system. However, if a customer or potential customer never retrieves the customer's data, then the customer may not see the benefit in the data service. As such, it may be beneficial to alert the customer or potential customer upon detecting an event the customer may desire to be apprised of.

Such a process is depicted by process flow 800. Process flow 800 may begin at block 802 where live data associated with a customer is received. At block 804, the live data is routed to a dual-queue node assigned to the customer. In a multi-tenant system this process would be similar to that discussed in reference to FIG. 3 above. At block 806, the live data may be loaded into a live data queue of the dual-queue node.

At block 808, the live data may be processed to generate summary statistics. The summary statistics may be generated, for example, by transaction processor 230 and may be stored in conjunction with the collections discussed above. The summary statistics may include any data that is able to be derived from the received live data, including crash statistics and usage statistics associated with an application provided by the customer to the customer's users. These summary statistics may enable the customer to get a big picture view of the live data received for the customer and concerning the application, and may also enable the customer to view possible problem areas with the application or the use of the application.

At block 810, an alert is transmitted to the customer in response to detecting an alert event. An alert event, in some embodiments, is based on the generated summary statistics. For example, if the summary statistics show that the customer's application has crashed a certain number of times, then this could trigger an alert event. Likewise, if the summary statistics show that the usage of the customer's application is reduced, then this could cause an alert event to be triggered. The alert event may also be based on other criteria, in addition to, or in place of, the summary statistics. For example, an alert may be sent when the stale queue associated with the customer reaches, or falls below, a predefined threshold of available space or when the stale data reaches, or surpasses, a predefined amount of stale data. An alert may also be triggered in the event that data from the stale data queue is deleted, as discussed in reference to FIG. 7 above. The alert may also be based on an amount of time since the customer last logged in. In addition, the alert may be based on, or include, demographic data associated with use of an application provided by the customer. Such demographic data may include, for example, a location of the use of the application, data derived from the location of use, such as average income in the geographic location, population density of the geographic location, average age of the geographic location, etc. The above discussed demographic data is meant to be illustrative of possible demographic data and should not be treated as limiting of this disclosure. It will be apparent to one of skill in the art that a multitude of other demographic data can be utilized, and this is expressly contemplated herein.

The alerts may be generated, for example, by queue monitor 236, which would have access to any of the applicable information discussed above. The alerts may include any applicable information surrounding the alert event, or any additional information that may be useful to the customer. For example, the alert may include a number of crashes of the customer's application, statistics on the usage of the customer's application, an indication of an amount of space available in the customer's stale data queue, an indication of an amount of data in the customer's stale data queue, a number of transactions that have been received since the user last logged in, etc. Alerts such as these may be beneficial to try and retain existing customers or attract potential customers by getting their attention directed towards the collected data. As such, it may also be beneficial to include a link in the alert to the customer's data in an effort to make the customer's access of the data easier or a link to enable the customer to migrate from a multi-tenant server to a single tenant server. In embodiments, the alert may be sent via any suitable medium including email, text message (e.g., via short message service (SMS)), a chat application that enables the customer to initiate a chat with the data service to see what options are available to the customer (e.g., upgrades to the customer's current service), or a pop-up message (e.g., in an application provided by the data service).

In addition to being utilized to trigger alerts, the summary statistics may also be utilized to give the customer an overview of the data. For example, when the customer is downloading transactions, the summary statistics may be utilized to give the customer an almost immediate picture of the data that the customer is downloading. In addition, the summary statistics, in embodiments, may also include summary statistics on data that has been deleted due to a deletion event, for example. As such, although the customer cannot view the data, since it was deleted, the customer can still see what the statistics were for that deleted data. In addition, as discussed elsewhere herein, the customer may actually have multiple dual-queue systems assigned to the customer. For example, the customer may have a dual-queue node associated with each of a number of applications that are provided by the customer. The summary statistics may be aggregated and presented to the customer as an aggregate summary statistics report across all of the customer's application.

Figure 9:
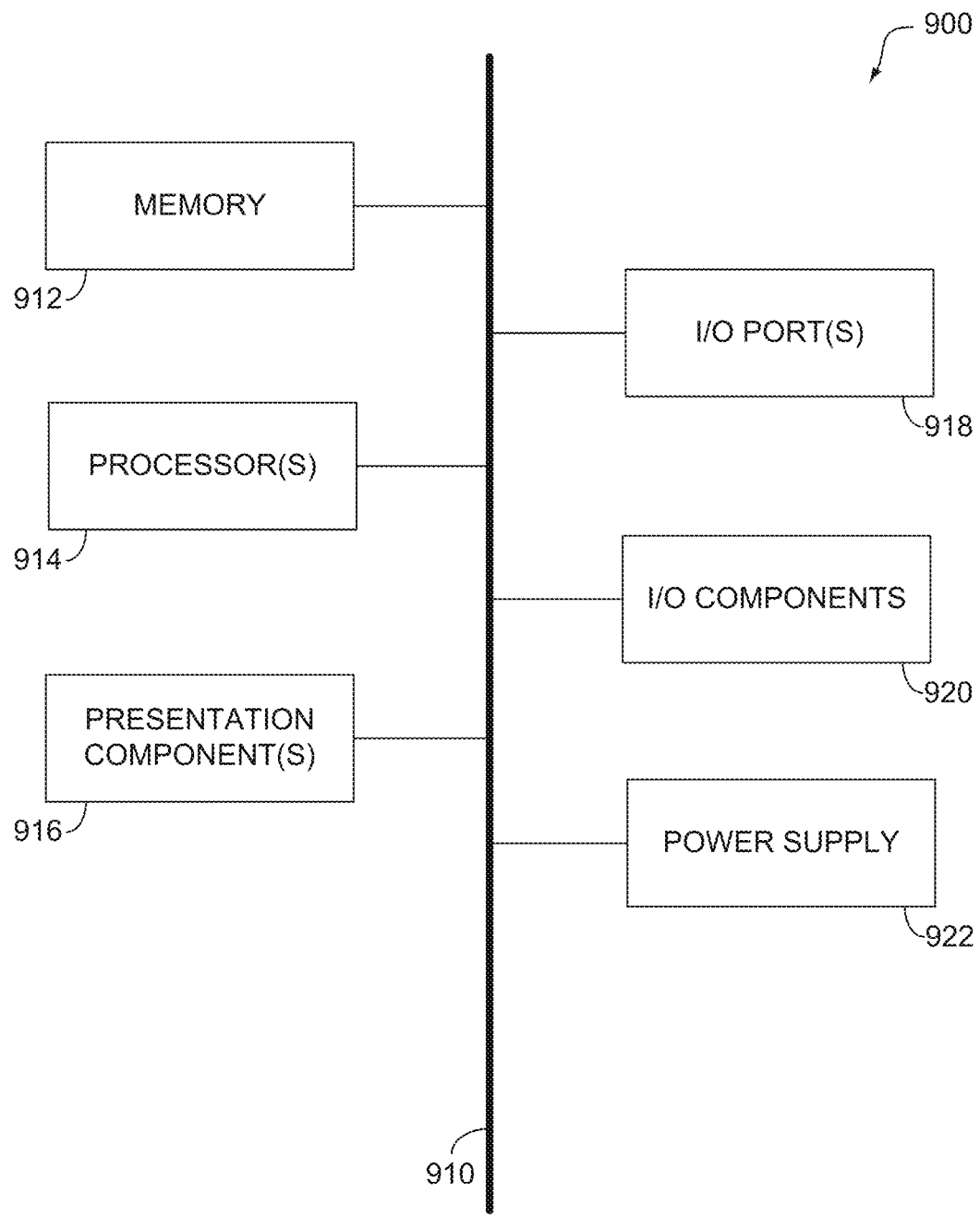
FIG. 9 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 9, an illustrative operating environment for implementing embodiments of the present invention is shown and designated generally as computing device 900. Computing device 900 is but one example of a suitable computing environment and is not intended to suggest any limitation as to the scope of use or functionality of the invention. Neither should the computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialized computing devices, etc. The invention may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output (I/O) ports 918, I/O components 920, and an illustrative power supply 922. Bus 910 represents what may be one or more busses (such as, for example, an address bus, data bus, or combination thereof). Although depicted in FIG. 9, for the sake of clarity, as delineated boxes that depict groups of devices without overlap between these groups of devices, in reality, this delineation is not so clear cut and a device may well fall within multiple ones of these depicted boxes. For example, one may consider a display to be one of the one or more presentation components 916 while also being one of the I/O components 920. As another example, processors have memory integrated therewith in the form of cache; however, there is no overlap depicted between the one or more processors 914 and the memory 912. A person of skill in the art will readily recognize that such is the nature of the art, and it is reiterated that the diagram of FIG. 9 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 900 of FIG. 9 and any other reference to "computing device," unless the context clearly indicates otherwise.

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se, such as, for example, a carrier wave. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Typical hardware devices may include, for example, solid-state memory, hard drives, optical-disc drives, etc. Computing device 900 includes one or more processors 914 that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a stylus, a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described elsewhere herein) associated with a display of the computing device 900. The computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion.

As can be understood, implementations of the present disclosure provide for various approaches to data processing. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A computer-implemented method comprising:
receiving, at a computing system, data associated with an entity;
determining that a first dual-queue node is assigned to the entity, the first dual-queue node including a live data queue and a stale data queue;
routing the data to the first dual-queue node, wherein the first dual-queue node stores the data;
causing the first dual-queue node to load the data into the live data queue for processing;
employing a dual-queue monitor, initialized for the first dual-queue node, to generate an alert, wherein generating the alert is triggered by one or more events encoded in the data; and
providing the alert to the entity.

2. The computer-implemented method of claim 1, further comprising:
upon a determination that no dual-queue node is assigned to the entity, dynamically instantiating the first dual-queue node;
allocating a portion of memory of the computing system for the live data queue of the first dual-queue node; and
assigning the first dual-queue node to the entity.

3. The computer-implemented method of claim 1, further comprising:
identifying a partition in a persistent data store associated with the computing system; and
employing the identified partition as the stale data queue of the first dual-queue node.

4. The computer-implemented method of claim 1, further comprising:
initializing a partition in a persistent data store associated with the computing system; and
employing the initialized partition as the stale data queue of the first dual-queue node.

5. The computer-implemented method of claim 1, further comprising: updating queue-entity mapping data of the computing system to include the first dual-queue node and the first dual-queue node's assignment to the entity.

6. The computer-implemented method of claim 1, further comprising:
initializing the dual-queue monitor for the first dual-queue node.

7. The computer-implemented method of claim 1, further comprising:
causing the first dual-queue node to generate summary statistics based on the data; and
causing the first dual-queue node to detect one or more events encoded in the data based on the generated summary statistics.

8. The computer-implemented method of claim 1, further comprising:
causing the first dual-queue node to detect an event encoded in the data, wherein the detected event is generated when an available space of the stale data queue of the first dual-queue node falls below a predefined threshold.

9. The computer-implemented method of claim 1, further comprising:
causing the first dual-queue node to detect an event encoded in the data, wherein the event includes a deletion associated with stale data stored in the stale data queue.

10. The computer-implemented method of claim 1, further comprising:
causing the first dual-queue node to detect an event encoded in the data, wherein the event is based on an amount of time elapsed since credentials associated with the entity were last employed to access the computing system.

11. The computer-implemented method of claim 1, further comprising:
providing the entity with an alert that includes demographic data associated with a use of an application provided by the entity.

12. The computer-implemented method of claim 1, further comprising:
providing the entity with an alert that includes a link to particular data associated with the alert.

13. The computer-implemented method of claim 1, further comprising:
providing the entity with an alert that indicates an amount of space that is currently available in the stale data queue.

14. The computer-implemented method of claim 1, further comprising:
causing the first dual-queue node to detect a deletion event associated with stale data stored in the stale data queue;
generating summary statistics based on the received data, wherein the summary statistics includes deletion statistics based on the deletion event; and
providing the summary statistics to the entity.

15. The computer-implemented method of claim 1, further comprising:
causing the first dual-queue node to generate summary statistics based on the received data, wherein the summary statistics include statistics that are aggregated across a plurality of dual-data queues associated with the entity; and
providing the summary statistics to the entity.

16. The computer-implemented method of claim 11, further comprising:
transmitting an alert to the entity, wherein the alert is transmitted by at least one of an email, a short message service (SMS), a chat application, or a pop-up message.

17. The computer-implemented method of claim 1, further comprising:
storing a persistent copy of the received data in the stale data queue.

18. The computer-implemented method of claim 1, further comprising:
determining a subset of stale data stored in the stale data queue for deletion.

19. The computer-implemented method of claim 1, further comprising:
causing the first dual-queue node to monitor the stale data queue for a deletion event.

20. The computer-implemented method of claim 1, further comprising:
establishing a connection with a remote data store that is separate from the computing system;
employing the connection to transmit a portion of stale data stored in the stale data queue to the remote data store; and
deleting the portion of the stale data from the stale data queue.

21. The computer-implemented method of claim 1, wherein the computing system is a multi-tenant system, and wherein the method further comprises:
receiving a request to migrate the data to a single-tenant system associated with the entity;
dynamically instantiating a second dual-queue node associated with the entity on the single-tenant system;
forwarding the data to the second dual-queue node instantiated in the single-tenant system; and
terminating the first dual-queue node instantiated in the multi-tenant system.

22. The computer-implemented method of claim 1, further comprising:
receiving a request for the data;
determining that a copy of the data is stored as stale data in the stale data queue;
retrieving the copy of the data stored as stale data; and
employing the copy of the data to service the request for the data.

23. The computer-implemented method of claim 1, further comprising:
in response to determining, based on a period of inactivity, that the first dual-queue node is inactive, terminating the first dual-queue node.

24. The computer-implemented method of claim 1, further comprising:
in response to determining that the first dual-queue node is inactive, terminating the first dual-queue node; and
in response to receiving additional data associated with the entity, re-instantiating the first dual-queue node using preserved state data stored in the stale data queue for the terminated first dual-queue node.

25. A computing system comprising:
one or more processors; and
one or more computer-readable storage media containing instructions which, in response to execution by the one or more processors, cause the one or more processors to perform actions including:
receiving, at the computing system, data associated with an entity;

determining that a first dual-queue node is assigned to the entity, the first dual-queue node including a live data queue and a stale data queue;

routing the data to the first dual-queue node, wherein the first dual-queue node stores the data; and causing the first dual-queue node to load the data into the live data queue for processing;

employing a dual-queue monitor, initialized for the first dual-queue node, to generate an alert, wherein generating the alert is triggered by one or more events encoded in the data;

providing the alert to the entity.

26. The computing system of claim 25, wherein the computing system further comprises a plurality of dual-queue nodes that does not include the first dual-queue node, the actions further comprising:

in response to determining that each of the plurality of dual-queue nodes is not assigned to the entity, dynamically instantiating the first dual-queue node;

allocating a portion of memory of the computing system for the live data queue of the first dual-queue node; and assigning the first dual-queue node to the entity.

27. The system of claim 25, wherein the computing system comprises a plurality of dual-queue nodes that does not include the first dual-queue node, the actions further comprising:

in response to determining that each of the plurality of dual-queue nodes is not assigned to the entity, dynamically instantiating the first dual-queue node;

identifying a partition in a persistent data store associated with the computing system;

employing the identified partition as the stale data queue of the first dual-queue node; and assigning the first dual-queue node to the entity.

28. One or more non-transitory computer-storage media having executable instructions, which, when executed by a computing device, cause the computing device to performs actions comprising:

receiving, at a computing system, data associated with an entity;

determining that a first dual-queue node is assigned to the entity, the first dual-queue node including a live data queue and a stale data queue;

routing the data to the first dual-queue node, wherein the first dual-queue node stores the data;

causing the first dual-queue node to load the data into the live data queue for processing;

employing a dual-queue monitor, initialized for the first dual-queue node, to generate an alert, wherein generating the alert is triggered by one or more events encoded in the data; and providing the alert to the entity.

29. The one or more computer-storage media of claim 28, wherein the computing system comprises a plurality of dual-queue nodes that does not include the first dual-queue node, the actions further comprising:

in response to determining that each of the plurality of dual-queue nodes is not assigned to the entity, dynamically instantiating the first dual-queue node;

initializing a partition in a persistent data store associated with the computing system;

employing the initialized partition as the stale data queue of the first dual-queue node; and assigning the first dual-queue node to the entity.

30. The one or more computer-storage media of claim 28, wherein the computing system comprises a plurality of dual-queue nodes that does not include the first dual-queue node, the actions further comprising:

in response to determining that each of the plurality of dual-queue nodes is not assigned to the entity, dynamically instantiating the first dual-queue node;

assigning the first dual-queue node to the entity; and updating queue-entity mapping data of the computing system to include the first dual-queue node and the first dual-queue node's assignment to the entity.

\* \* \* \* \*